US010389787B2

(12) United States Patent
Xu et al.

(10) Patent No.: US 10,389,787 B2
(45) Date of Patent: Aug. 20, 2019

(54) METHOD, APPARATUS AND SYSTEM FOR TRANSMITTING MEDIA STREAM

(71) Applicant: Huawei Technologies Co., Ltd., Shenzhen (CN)

(72) Inventors: Mingyuan Xu, Nanning (CN); Qiang Yan, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 515 days.

(21) Appl. No.: 14/553,747

(22) Filed: Nov. 25, 2014

(65) Prior Publication Data

US 2015/0081796 A1 Mar. 19, 2015

Related U.S. Application Data

(63) Continuation of application No. PCT/CN2013/081686, filed on Aug. 16, 2013.

(51) Int. Cl.

| | |
|---|---|
| ***G06F 15/16*** | (2006.01) |
| ***H04L 29/06*** | (2006.01) |
| ***H04L 29/08*** | (2006.01) |

(52) U.S. Cl.
CPC .......... *H04L 65/607* (2013.01); *H04L 65/403* (2013.01); *H04L 67/141* (2013.01)

(58) Field of Classification Search
CPC ..... H04L 65/403; H04L 65/607; H04L 67/00; H04L 67/141; H04L 65/601; H04L 65/608
See application file for complete search history.

(56) References Cited

U.S. PATENT DOCUMENTS

| | | | | |
|---|---|---|---|---|
| 6,118,787 | A | 9/2000 | Kalkunte et al. | |
| 2008/0289020 | A1* | 11/2008 | Cameron | H04L 63/0861 726/9 |

(Continued)

FOREIGN PATENT DOCUMENTS

| | | | | |
|---|---|---|---|---|
| CN | 102308560 A | 1/2012 | | |
| CN | 102333124 A | 1/2012 | | |
| WO | WO 2012106894 A1 * | 8/2012 | | H04L 65/80 |

OTHER PUBLICATIONS

Uberti et al., "Javascript Session Establishment Protocol draft-uberti-rtcweb-jsep-02," Network Working Group, pp. 1-28, Internet-Draft, IETF Trust, Reston, Virginia (Feb. 16, 2012).

*Primary Examiner* — Liang Che A Wang
*Assistant Examiner* — Ayele F Woldemariam
(74) *Attorney, Agent, or Firm* — Leydig, Voit & Mayer, Ltd.

(57) ABSTRACT

Embodiments of the present invention relate to a method, an apparatus and a system for transmitting a media stream. The method is executed by an access terminal, includes: establishing a real-time collaboration channel between the access terminal and a network computer; sending through a first VDI channel to the network computer an operation instruction input by a user; receiving a real-time collaboration message that is sent through the real-time collaboration channel by the network computer; performing, through the network computer, media negotiation with a communication device, so as to determine a media attribute parameter that is used to transmit a media stream between the access terminal and the communication device; and transmitting, by the access terminal, a media stream mutually with the communication device according to the media attribute parameter determined through the media negotiation.

24 Claims, 13 Drawing Sheets

(56) References Cited

U.S. PATENT DOCUMENTS

| | | | | |
|---|---|---|---|---|
| 2011/0224811 | A1 | 9/2011 | Lauwers et al. | |
| 2012/0131377 | A1* | 5/2012 | Baird | G06F 11/1479 714/4.11 |
| 2012/0218374 | A1* | 8/2012 | Matula | H04L 65/1006 348/14.12 |
| 2012/0239729 | A1* | 9/2012 | Hefter | G06F 9/4416 709/203 |
| 2013/0091291 | A1* | 4/2013 | Liu | H04L 65/1069 709/228 |
| 2013/0120455 | A1 | 5/2013 | Friedl et al. | |
| 2014/0115051 | A1* | 4/2014 | Li | H04L 65/80 709/203 |

* cited by examiner

METHOD, APPARATUS AND SYSTEM FOR TRANSMITTING MEDIA STREAM

CROSS-REFERENCE TO RELATED APPLICATIONS

This application is a continuation of International Patent Application No. PCT/CN2013/081686, filed on Aug. 16, 2013, which is hereby incorporated by reference in its entirety.

TECHNICAL FIELD

The present invention relates to the field of communications technologies, and in particular, to a method, an apparatus and a system for transmitting a media stream.

BACKGROUND

Cloud computing is a new way of utilizing resources on Internet and performs on-demand computation for users depending on heterogeneous and autonomous services on Internet.

The existing desktop cloud is also a type of cloud in the definition of cloud computing. The desktop cloud separates a desktop environment of a user terminal (that is, a user application interface) from a physical machine by using a cloud computing mode, so as to become a service that can provide the user application interface for outsiders. Computing and storage resources required by the user application interface environment are gathered on a central server, to replace local computing and storage resources of a terminal. The computing and storage resources on the central server are also shared and scalable, so that different user application interface environment resources are allocated and delivered on demand, so as to achieve objectives of improving a resource utilization rate and reducing the total cost of ownership.

A thin client (TC for short) is a most common device that accesses the desktop cloud, which generally is a device that is embedded with an independent embedded operating system and can be connected over various protocols to a virtual machine running on a server. FIG. 1 shows a schematic diagram of a user accessing a desktop cloud system by using a personal computer (PC for short) or a TC in the prior art. In the desktop cloud system, a cloud server is virtualized into multiple virtual machines, which are also known as network computers (NC for short), and an application required by the user runs inside a certain NC. The user is connected to the cloud server through a browser on the PC or the TC, and the cloud server allocates one NC to the user according to a scheduling policy of the cloud server. One virtualized desktop infrastructure (VDI for short) channel is established between the TC/PC and the NC, and used to transfer a user application interface inside the NC to the TC/PC for display, and also transfer data input by the user on the TC/PC side to the NC by using a device such as a mouse and a keyboard. The application, data and the like required by the user are all stored in the NC, and the TC/PC is only equivalent to a "display" of the NC.

Further, to meet a requirement of video and audio communication between users, a deployment solution of the prior art is specifically as follows: During audio communication, when an audio stream sent by a peer party of the communication reaches an NC, the NC first decodes the received audio stream into original audio data, then compresses the original audio data into VDI data, and transfers the VDI data to a TC/PC through a VDI channel, and the TC/PC decompresses the VDI data to obtain the original audio data and then presents the original audio data to a user. During video communication, after a video stream reaches an NC, the NC first decodes the video stream, performs layout and rendering in a video window of the NC, and then presents a whole user application interface on a TC/PC through a VDI channel When the TC/PC obtains a local media stream, the TC/PC transfers the media stream obtained by a microphone and a camera to the NC through the VDI channel, and the NC decompresses VDI data to obtain the media stream, encodes the media stream, and then transfers the encoded media stream to the peer party of the communication.

Therefore, the solution for transmitting a media stream in the prior art reveals the following defects: 1) The NC needs to perform conversion and transmission on media data, and the conversion and transmission process causes obvious delay of the media stream; and 2) The media data needs to be transferred between the TC/PC and the NC through the VDI channel, which increases bandwidth occupancy between the TC/PC and the NC, and causes bandwidth waste.

SUMMARY

The present invention provides a method, an apparatus and a system for transmitting a media stream, so as to solve problems in the prior art that the delay of a media stream is obvious because an NC needs to perform conversion and transmission on media data, and bandwidth occupancy between a TC/PC and the NC is increased and bandwidth is wasted because the media stream needs to be transferred back and forth between the TC/PC and the NC through a VDI channel According to a first aspect, an embodiment of the present invention provides a method for transmitting a media stream, where the transmission method is executed by an access terminal; a first virtualized desktop infrastructure VDI channel is established between the access terminal and a network computer allocated by a cloud server to the access terminal; and the method includes:

establishing, by the access terminal, a real-time collaboration channel between the access terminal and the network computer;

sending, by the access terminal through the first VDI channel to the network computer, an operation instruction input by a user;

receiving, by the access terminal, a real-time collaboration message that is sent by the network computer through the real-time collaboration channel, where the real-time collaboration message is sent when the network computer determines that the operation instruction is an operation instruction used to instruct that a call be initiated, and is used to instruct the access terminal to initiate media negotiation with the communication device;

performing, by the access terminal through the network computer, media negotiation with the communication device to determine a media attribute parameter that is used to transmit a media stream between the access terminal and the communication device, where information used for the media negotiation is transmitted between the access terminal and the network computer through the real-time collaboration channel; and transmitting, by the access terminal, a media stream mutually with the communication device according to the media attribute parameter determined through the media negotiation.

In a first possible implementation manner, the establishing, by the access terminal, a real-time collaboration channel between the access terminal and the network computer specifically includes:

establishing, by the access terminal, a WebSocket channel between the access terminal and the network computer through a web socket WebSocket server; or, establishing, by the access terminal, a second VDI channel between the access terminal and the network computer; or, establishing, by the access terminal, a point-to-point data channel between a browser in the access terminal and a browser in the network computer by using a data channel mechanism in a browser web real-time communication WebRTC application of the access terminal.

With reference to the first aspect or the first possible implementation manner of the first aspect, in a second possible implementation manner, the performing, by the access terminal through the network computer, media negotiation with the communication device to determine a media attribute parameter that is used to transmit a media stream between the access terminal and the communication device specifically includes:

obtaining, by the access terminal, a first media attribute parameter supported by the access terminal, where the first media attribute parameter includes a media format supported by the access terminal, and an IP address and a port number that are used to receive media;

sending, by the access terminal, the first media attribute parameter to the network computer through the real-time collaboration channel, so as to enable the network computer to send a connection request message carrying the first media attribute parameter to the communication device to be called; and receiving, by the access terminal, a second media attribute parameter that is received by the network computer from the communication device and is sent by the network computer through the real-time collaboration channel, where the second media attribute parameter includes an IP address and a port number of the communication device that are used to receive media, and a media format that is supported by both the access terminal and the communication device and is determined by the communication device according to the first media attribute parameter; and the transmitting, by the access terminal, a media stream mutually with the communication device according to the media attribute parameter determined through the media negotiation specifically includes:

sending, by the access terminal, first media to the communication device by using the IP address and the port number of the communication device that are used to receive media, and receiving second media that is sent by the communication device by using the IP address and the port number of the access terminal that are used to receive media, where both the first media and the second media are encoded by adopting the media format included in the second media attribute parameter.

With reference to the first aspect or the second possible implementation manner of the first aspect, in a third possible implementation manner, the obtaining, by the access terminal, a first media attribute parameter supported by the access terminal specifically includes:

invoking, by the access terminal, a new peer connection interface function in a browser application programming interface API of the access terminal; and generating, by the access terminal, a peer connection interface by using the new peer connection interface function, and obtaining, by using a create offer function included in the peer connection interface, the first media attribute parameter supported by the access terminal.

According to a second aspect, an embodiment of the present invention provides a method for transmitting a media stream, where the method is executed by a network computer allocated by a cloud server to an access terminal; a first virtualized desktop infrastructure VDI channel is established between the network computer and the access terminal; and the method includes:

establishing, by the network computer, a real-time collaboration channel between the network computer and the access terminal;

receiving, by the network computer, an operation instruction that is input by a user and is sent by the access terminal through the first VDI channel;

when the network computer determines that the operation instruction is an operation instruction used to instruct that a call be initiated, sending, by the network computer, a real-time collaboration message to the access terminal through the real-time collaboration channel, where the real-time collaboration message is used to instruct the access terminal to initiate media negotiation with the communication device; and forwarding, by the network computer, information used to perform media negotiation between the access terminal and the communication device, to enable the access terminal and the communication device to determine, through the media negotiation, a media attribute parameter that is used to transmit a media stream between the access terminal and the communication device, so that the access terminal transmits a media stream mutually with the communication device according to the media attribute parameter determined through the media negotiation, where the information used to perform the media negotiation is transmitted between the network computer and the access terminal through the real-time collaboration channel In a first possible implementation manner, the establishing, by the network computer, a real-time collaboration channel between the network computer and the access terminal specifically includes:

establishing, by the network computer, a WebSocket channel between the network computer and the access terminal through a web socket WebSocket server; or, establishing, by the network computer, a second VDI channel between the network computer and the access terminal; or, establishing, by the network computer, a point-to-point data channel between a browser in the network computer and a browser in the access terminal by using a data channel mechanism in a browser web real-time communication WebRTC application of the network computer.

With reference to the second aspect or the first possible implementation manner of the second aspect, in a second possible implementation manner, the forwarding, by the network computer, information used to perform media negotiation between the access terminal and the communication device, to enable the access terminal and the communication device to determine, through the media negotiation, a media attribute parameter that is used to transmit a media stream between the access terminal and the communication device specifically includes:

receiving, by the network computer, a first media attribute parameter that is supported by the access terminal and is sent by the access terminal through the real-time collaboration channel, where the first media attribute parameter includes a media format supported by the access terminal, and an IP address and a port number that are used to receive media;

sending, by the network computer, a connection request message to the communication device according to the operation instruction that is input by the user and used to instruct that a call be initiated, where the connection request message includes the first media attribute parameter;

receiving, by the network computer, a connect reply message that is sent by the communication device when the communication device determines that the communication device supports the first media attribute parameter, where the connect reply message includes a second media attribute parameter supported by the communication device, and the second media attribute parameter includes an IP address and a port number of the communication device that are used to receive media, and a media format that is supported by both the access terminal and the communication device and is determined by the communication device according to the first media attribute parameter; and sending, by the network computer, the second media attribute parameter to the access terminal through the real-time collaboration channel, so that the access terminal sends first media to the communication device by using the IP address and the port number of the communication device that are used to receive media, and receives second media that is sent by the communication device by using the IP address and the port number of the access terminal that are used to receive media, where both the first media and the second media are encoded by adopting the media format included in the second media attribute parameter.

With reference to the second aspect or the second possible implementation manner of the second aspect, in a third possible implementation manner, before the sending, by the network computer, a connection request message to the communication device according to the operation instruction, the method further includes:

invoking, by the network computer, a WebRTC signaling message protocol stack; and performing, by the network computer, encapsulation processing on the first media attribute parameter by using the signaling message protocol stack, to generate the connection request message, where the connection request message includes the first media attribute parameter.

According to a third aspect, an embodiment of the present invention provides a method for transmitting a media stream, where the transmission method is executed by an access terminal; a first virtualized desktop infrastructure VDI channel is established between the access terminal and a network computer allocated by a cloud server to the access terminal; and the method includes:

establishing, by the access terminal, a real-time collaboration channel between the access terminal and the network computer;

receiving, by the access terminal, a real-time collaboration message that is sent by the network computer through the real-time collaboration channel, where the real-time collaboration message is sent by the network computer when the network computer receives a call request that is sent by a communication device and used to call a user corresponding to the access terminal, and the real-time collaboration message includes a first media attribute parameter that is supported by the communication device and is obtained by the network computer by parsing the call request, and is used to instruct the access terminal to perform media negotiation with the communication device according to the first media attribute parameter supported by the communication device;

performing, by the access terminal through the network computer, media negotiation with the communication device to determine a media attribute parameter that is used to transmit a media stream between the access terminal and the communication device, where information used for the media negotiation is transmitted between the access terminal and the network computer through the real-time collaboration channel; and transmitting, by the access terminal, a media stream mutually with the communication device according to the media attribute parameter determined through the media negotiation.

In a first possible implementation manner, the establishing, by the access terminal, a real-time collaboration channel between the access terminal and the network computer specifically includes:

establishing, by the access terminal, a WebSocket channel between the access terminal and the network computer through a web socket WebSocket server; or, establishing, by the access terminal, a second VDI channel between the access terminal and the network computer; or, establishing, by the access terminal, a point-to-point data channel between a browser in the access terminal and a browser in the network computer by using a data channel mechanism in a browser web real-time communication WebRTC application of the access terminal.

With reference to the third aspect or the first possible implementation manner of the third aspect, in a second possible implementation manner, the first media attribute parameter includes a media format supported by the communication device, and an IP address and a port number that are used to receive media;

the performing, by the access terminal through the network computer, media negotiation with the communication device to determine a media attribute parameter that is used to transmit a media stream between the access terminal and the communication device specifically includes:

determining, by the access terminal according to the first media attribute parameter, a second media attribute parameter supported by the access terminal, where the second media attribute parameter includes an IP address and a port number of the access terminal that are used to receive media, and a media format that is supported by both the access terminal and the communication device and is determined by the access terminal according to the first media attribute parameter;

sending, by the access terminal, the second media attribute parameter to the network computer through the real-time collaboration channel, so as to enable the network computer to forward the second media attribute parameter to the communication device; and the transmitting, by the access terminal, a media stream mutually with the communication device according to the media attribute parameter determined through the media negotiation specifically includes:

sending, by the access terminal, first media to the communication device by using the IP address and the port number of the communication device that are used to receive media, and receiving second media that is sent by the communication device by using the IP address and the port number of the access terminal that are used to receive media, where both the first media and the second media are encoded by adopting the media format included in the second media attribute parameter.

With reference to the third aspect or the second possible implementation manner of the third aspect, in a third possible implementation manner, the determining, by the access terminal, the second media attribute parameter according to the first media attribute parameter specifically includes:

invoking, by the access terminal, a new peer connection interface function in a browser application programming interface API of the access terminal; and generating, by the access terminal, a peer connection interface by using the new peer connection interface function, and obtaining the second media attribute parameter by using a create answer function included in the peer connection interface.

According to a fourth aspect, an embodiment of the present invention provides a method for transmitting a media stream, where the method is executed by a network computer allocated by a cloud server to an access terminal; a first virtualized desktop infrastructure VDI channel is established between the network computer and the access terminal; and the method includes:

establishing, by the network computer, a real-time collaboration channel between the network computer and the access terminal;

receiving, by the network computer, a call request that is sent by a communication device and used to call a user corresponding to the access terminal;

sending, by the network computer according to the call request, a real-time collaboration message to the access terminal through the real-time collaboration channel, where the real-time collaboration message includes a first media attribute parameter that is supported by the communication device and is obtained by the network computer by parsing the call request, and is used to instruct the access terminal to perform media negotiation with the communication device according to the first media attribute parameter supported by the communication device; and forwarding, by the network computer, information used to perform media negotiation between the access terminal and the communication device, to enable the access terminal and the communication device to determine, through the media negotiation, a media attribute parameter that is used to transmit a media stream between the access terminal and the communication device, so that the access terminal transmits a media stream mutually with the communication device according to the media attribute parameter determined through the media negotiation, where the information used to perform the media negotiation is transmitted between the network computer and the access terminal through the real-time collaboration channel In a first possible implementation manner, the establishing, by the network computer, a real-time collaboration channel between the network computer and the access terminal specifically includes:

establishing, by the network computer, a WebSocket channel between the network computer and the access terminal through a web socket WebSocket server; or, establishing, by the network computer, a second VDI channel between the network computer and the access terminal; or, establishing, by the network computer, a point-to-point data channel between a browser in the network computer and a browser in the access terminal by using a data channel mechanism in a browser web real-time communication WebRTC application of the network computer.

With reference to the fourth aspect or the first possible implementation manner of the fourth aspect, in a second possible implementation manner, the first media attribute parameter includes a media format supported by the communication device, and an IP address and a port number that are used to receive media; and the forwarding, by the network computer, information used to perform media negotiation between the access terminal and the communication device, to enable the access terminal and the communication device to determine, through the media negotiation, a media attribute parameter that is used to transmit a media stream between the access terminal and the communication device specifically includes:

receiving, by the network computer, a second media attribute parameter that is sent by the access terminal through the real-time collaboration channel, where the second media attribute parameter includes an IP address and a port number of the access terminal that are used to receive media, and a media format that is supported by both the access terminal and the communication device and is determined by the access terminal according to the first media attribute parameter; and forwarding, by the network computer, the second media attribute parameter to the communication device, so that the communication device sends first media to the access terminal by using the IP address and the port number of the access terminal that are used to receive media, and receives second media that is sent by the access terminal by using the IP address and the port number of the communication device that are used to receive media, where both the first media and the second media are encoded by adopting the media format included in the second media attribute parameter.

With reference to the fourth aspect or the second possible implementation manner of the fourth aspect, in a third possible implementation manner, before the forwarding, by the network computer, the second media attribute parameter to the communication device, the method further includes:

invoking, by the network computer, a WebRTC signaling message protocol stack;

performing, by the network computer, encapsulation processing on the second media attribute parameter by using the signaling message protocol stack, to generate a call response; and sending, by the network computer, the call response to the communication device, where the call response includes the second media attribute parameter.

According to a fifth aspect, an embodiment of the present invention provides an apparatus for transmitting a media stream, where a first virtualized desktop infrastructure VDI channel is established between the apparatus and a network computer allocated by a cloud server to the apparatus, where the apparatus includes:

a collaboration channel establishing unit, configured to establish a real-time collaboration channel between the apparatus and the network computer;

a sending unit, configured to send, to the network computer through the first VDI channel, an operation instruction input by a user;

a receiving unit, configured to receive a real-time collaboration message that is sent by the network computer through the real-time collaboration channel established by the collaboration channel establishing unit, where the real-time collaboration message is sent when the network computer determines that the operation instruction is an operation instruction used to initiate a call, and is used to instruct the apparatus to initiate media negotiation with the communication device;

a negotiation determining unit, configured to perform media negotiation with the communication device through the network computer, so as to determine a media attribute parameter that is used to transmit a media stream between the apparatus and the communication device, and configured to transmit the media attribute parameter determined through the media negotiation to a media transmitting unit, where the real-time collaboration channel established between the apparatus and the network computer by the collaboration channel establishing unit transmits information used for the media negotiation; and the media transmitting unit, configured to receive the media attribute parameter determined through the media negotiation from the negotiation determining unit, and transmit a media stream mutually with the communication device according to the media attribute parameter determined through the media negotiation.

In a first possible implementation manner, the collaboration channel establishing unit is specifically configured to:

establish a WebSocket channel between the apparatus and the network computer through a web socket WebSocket server; or, establish a second VDI channel between the apparatus and the network computer; or, establish a point-to-point data channel between a browser in the apparatus and a browser in the network computer by using a data channel mechanism in a browser web real-time communication WebRTC application of the apparatus.

With reference to the fifth aspect or the first possible implementation manner of the fifth aspect, in a second possible implementation manner, the negotiation determining unit specifically includes an obtaining subunit and a determining subunit, where:

the obtaining subunit is configured to obtain a first media attribute parameter supported by the apparatus, and configured to transmit the first media attribute parameter to the sending unit, where the first media attribute parameter includes a media format supported by the apparatus, and an IP address and a port number that are used to receive media;

the sending unit is further configured to receive the first media attribute parameter from the obtaining subunit, and send the first media attribute parameter to the network computer through the real-time collaboration channel established by the collaboration channel establishing unit, so as to enable the network computer to send a connection request message carrying the first media attribute parameter to the communication device to be called;

the receiving unit is further configured to receive a second media attribute parameter that is received by the network computer from the communication device and is sent by the network computer through the real-time collaboration channel established by the collaboration channel establishing unit, and transmit the second media attribute parameter to the determining subunit of the negotiation determining unit, where the second media attribute parameter includes an IP address and a port number of the communication device that are used to receive media, and a media format that is supported by both the apparatus and the communication device and is determined by the communication device according to the first media attribute parameter;

the determining subunit is configured to receive the second media attribute parameter from the receiving unit, and configured to transmit the second media attribute parameter to the media transmitting unit; and the media transmitting unit is specifically configured to send first media to the communication device by using the IP address and the port number of the communication device that are used to receive media, and receive second media that is sent by the communication device by using the IP address and the port number of the apparatus that are used to receive media, where both the first media and the second media are encoded by adopting the media format included in the second media attribute parameter.

With reference to the fifth aspect or the second possible implementation manner of the fifth aspect, in a third possible implementation manner, the obtaining subunit is specifically configured to:

invoke a new peer connection interface function in a browser application programming interface API of the apparatus; and generate a peer connection interface by using the new peer connection interface function, and obtain, by using a create offer function included in the peer connection interface, the first media attribute parameter supported by the apparatus.

According to a sixth aspect, an embodiment of the present invention provides an apparatus for transmitting a media stream, where the apparatus is allocated by a cloud server to an access terminal, and a first virtualized desktop infrastructure VDI channel is established between the apparatus and the access terminal, where the apparatus includes:

a collaboration channel establishing unit, configured to establish a real-time collaboration channel between the apparatus and the access terminal;

a receiving unit, configured to receive an operation instruction that is input by a user and is sent by the access terminal through the first VDI channel; and a sending unit, configured to: when it is determined that the operation instruction is an operation instruction used to instruct that a call be initiated, send a real-time collaboration message to the access terminal through the real-time collaboration channel established by the collaboration channel establishing unit, where the real-time collaboration message is used to instruct the access terminal to initiate media negotiation with the communication device, where the sending unit is further configured to forward information used to perform media negotiation between the access terminal and the communication device, to enable the access terminal and the communication device to determine, through the media negotiation, a media attribute parameter that is used to transmit a media stream between the access terminal and the communication device, so that the access terminal transmits a media stream mutually with the communication device according to the media attribute parameter determined through the media negotiation, where the information used to perform the media negotiation is transmitted between the apparatus and the access terminal through the real-time collaboration channel established by the collaboration channel establishing unit.

In a first possible implementation manner, the collaboration channel establishing unit is specifically configured to:

establish a WebSocket channel between the apparatus and the access terminal through a web socket WebSocket server; or, establish a second VDI channel between the apparatus and the access terminal; or, establish a point-to-point data channel between a browser in the apparatus and a browser in the access terminal by using a data channel mechanism in a browser web real-time communication WebRTC application of the apparatus.

With reference to the sixth aspect or the first possible implementation manner of the sixth aspect, in a second possible implementation manner, the receiving unit is specifically configured to receive a first media attribute parameter that is supported by the access terminal and is sent by the access terminal through the real-time collaboration channel established by the collaboration channel establishing unit, and configured to transmit the first media attribute parameter to the sending unit, where the first media attribute parameter includes a media format supported by the access terminal, and an IP address and a port number that are used to receive media;

the sending unit is specifically configured to receive the first media attribute parameter from the receiving unit, and send a connection request message to the communication device according to the operation instruction that is input by the user and used to instruct that a call be initiated, where the connection request message includes the first media attribute parameter;

the receiving unit is further specifically configured to receive a connect reply message that is sent by the communication device when the communication device determines that the communication device supports the first media attribute parameter, where the connect reply message includes a second media attribute parameter supported by the communication device, and configured to transmit the second media attribute parameter to the sending unit, where the second media attribute parameter includes an IP address and a port number of the communication device that are used to receive media, and a media format that is supported by both the access terminal and the communication device and is determined by the communication device according to the first media attribute parameter; and the sending unit is further specifically configured to receive the second media attribute parameter from the receiving unit, and send the second media attribute parameter to the access terminal through the real-time collaboration channel established by the collaboration channel establishing unit, so that the access terminal sends first media to the communication device by using the IP address and the port number of the communication device that are used to receive media, and receives second media that is sent by the communication device by using the IP address and the port number of the access terminal that are used to receive media, where both the first media and the second media are encoded by adopting the media format included in the second media attribute parameter.

With reference to the sixth aspect or the second possible implementation manner of the sixth aspect, in a third possible implementation manner, the transmitting apparatus further includes:

an invoking unit, configured to invoke a WebRTC signaling message protocol stack; and an encapsulating and generating unit, configured to perform encapsulation processing on the first media attribute parameter by using the signaling message protocol stack invoked by the invoking unit, to generate the connection request message, where the connection request message includes the first media attribute parameter.

According to a seventh aspect, an embodiment of the present invention provides an apparatus for transmitting a media stream, where a first virtualized desktop infrastructure VDI channel is established between the apparatus and a network computer allocated by a cloud server to the apparatus, where the apparatus includes:

a collaboration channel establishing unit, configured to establish a real-time collaboration channel between the apparatus and the network computer;

a receiving unit, configured to receive a real-time collaboration message that is sent by the network computer through the real-time collaboration channel established by the collaboration channel establishing unit, where the real-time collaboration message is sent by the network computer when the network computer receives a call request that is sent by a communication device and used to call a user corresponding to the apparatus, and the real-time collaboration message includes a first media attribute parameter that is supported by the communication device and is obtained by the network computer by parsing the call request, and is used to instruct the apparatus to perform media negotiation with the communication device according to the first media attribute parameter supported by the communication device;

a negotiation determining unit, configured to perform media negotiation with the communication device through the network computer, so as to determine a media attribute parameter that is used to transmit a media stream between the apparatus and the communication device, and configured to transmit the media attribute parameter determined through the media negotiation to a media transmitting unit, where the real-time collaboration channel established between the apparatus and the network computer by the collaboration channel establishing unit transmits information used for the media negotiation; and the media transmitting unit, configured to receive the media attribute parameter determined through the media negotiation from the negotiation determining unit, and transmit a media stream mutually with the communication device according to the media attribute parameter determined through the media negotiation.

In a first possible implementation manner, the collaboration channel establishing unit is specifically configured to:

establish a WebSocket channel between the apparatus and the network computer through a web socket WebSocket server; or, establish a second VDI channel between the apparatus and the network computer; or, establish a point-to-point data channel between a browser in the apparatus and a browser in the network computer by using a data channel mechanism in a browser web real-time communication WebRTC application of the apparatus.

With reference to the seventh aspect or the first possible implementation manner of the seventh aspect, in a second possible implementation manner, the first media attribute parameter included in the real-time collaboration message received by the receiving unit includes a media format supported by the communication device, and an IP address and a port number that are used to receive media; and the negotiation determining unit specifically includes a determining subunit and a sending subunit, where:

the determining subunit is configured to determine, according to the first media attribute parameter, a second media attribute parameter supported by the apparatus, and configured to transmit the second media attribute parameter to the sending subunit, where the second media attribute parameter includes an IP address and a port number of the apparatus that are used to receive media, and a media format that is supported by both the apparatus and the communication device and is determined by the apparatus according to the first media attribute parameter; and the sending subunit is configured to receive the second media attribute parameter from the determining subunit, and transmit the second media attribute parameter to the media transmitting unit, and configured to send the second media attribute parameter to the network computer through the real-time collaboration channel established by the collaboration channel establishing unit, so as to enable the network computer to forward the second media attribute parameter to the communication device, where the media transmitting unit is specifically configured to send first media to the communication device by using the IP address and the port number of the communication device that are used to receive media, and receive second media that is sent by the communication device by using the IP address and the port number of the apparatus that are used to receive media, where both the first media and the second media are encoded by adopting the media format included in the second media attribute parameter.

With reference to the seventh aspect or the second possible implementation manner of the seventh aspect, in a third possible implementation manner, the determining subunit is specifically configured to:

invoke a new peer connection interface function in a browser application programming interface API of the apparatus, generate a peer connection interface by using the new peer connection interface function, and obtain the second media attribute parameter by using a create answer function included in the peer connection interface.

According to an eighth aspect, an embodiment of the present invention provides an apparatus for transmitting a media stream, where the apparatus is allocated by a cloud server to an access terminal, and a first virtualized desktop infrastructure VDI channel is established between the apparatus and the access terminal, where the apparatus includes:

a collaboration channel establishing unit, configured to establish a real-time collaboration channel between the apparatus and the access terminal;

a receiving unit, configured to receive a call request that is sent by a communication device and used to call a user corresponding to the access terminal, and configured to transmit the call request to a sending unit;

the sending unit, configured to receive the call request from the receiving unit, and send, according to the call request, a real-time collaboration message to the access terminal through the real-time collaboration channel established by the collaboration channel establishing unit, where the real-time collaboration message includes a first media attribute parameter that is supported by the communication device and is obtained by the apparatus by parsing the call request, and is used to instruct the access terminal to perform media negotiation with the communication device according to the first media attribute parameter supported by the communication device; and the sending unit is further configured to forward information used to perform media negotiation between the access terminal and the communication device, to enable the access terminal and the communication device to determine, through the media negotiation, a media attribute parameter that is used to transmit a media stream between the access terminal and the communication device, so that the access terminal transmits a media stream mutually with the communication device according to the media attribute parameter determined through the media negotiation, where the information used to perform the media negotiation is transmitted between the apparatus and the access terminal through the real-time collaboration channel established by the collaboration channel establishing unit.

In a first possible implementation manner, the collaboration channel establishing unit is specifically configured to:

establish a WebSocket channel between the apparatus and the access terminal through a web socket WebSocket server; or, establish a second VDI channel between the apparatus and the access terminal; or, establish a point-to-point data channel between a browser in the apparatus and a browser in the access terminal by using a data channel mechanism in a browser web real-time communication WebRTC application of the apparatus.

With reference to the eighth aspect or the first possible implementation manner of the eighth aspect, in a second possible implementation manner, the first media attribute parameter included in the real-time collaboration message sent by the sending unit includes a media format supported by the communication device, and an IP address and a port number that are used to receive media;

the receiving unit is further configured to receive a second media attribute parameter that is sent by the access terminal through the real-time collaboration channel established by the collaboration channel establishing unit, and configured to transmit the second media attribute parameter to the sending unit, where the second media attribute parameter includes an IP address and a port number of the access terminal that are used to receive media and a media format that is supported by both the access terminal and the communication device and is determined by the access terminal according to the first media attribute parameter; and the sending unit is specifically configured to forward the second media attribute parameter received by the receiving unit to the communication device, so that the communication device sends first media to the access terminal by using the IP address and the port number of the access terminal that are used to receive media, and receives second media that is sent by the access terminal by using the IP address and the port number of the communication device that are used to receive media, where both the first media and the second media are encoded by adopting the media format included in the second media attribute parameter.

With reference to the eighth aspect or the second possible implementation manner of the eighth aspect, in a third possible implementation manner, the apparatus further includes:

an invoking unit, configured to invoke a WebRTC signaling message protocol stack; and an encapsulating and generating unit, configured to perform, by using the signaling message protocol stack invoked by the invoking unit, encapsulation processing on the second media attribute parameter received by the receiving unit, to generate a call response, and configured to transmit the call response to the sending unit, where:

the sending unit is specifically configured to send the call response generated by the encapsulating and generating unit to the communication device, where the call response includes the second media attribute parameter.

According to a ninth aspect, an embodiment of the present invention provides an apparatus for transmitting a media stream, where a first virtualized desktop infrastructure VDI channel is established between the apparatus and a network computer allocated by a cloud server to the apparatus; and the apparatus includes:

a network interface;

a processor; and a memory, where the network interface is configured to perform interaction communication with the network computer; and the memory is configured to store an application program, where the application program includes an instruction that can be used to enable the processor to execute the following processes:

establishing a real-time collaboration channel between the apparatus and the network computer;

sending, to the network computer through the first VDI channel, an operation instruction input by a user;

receiving a real-time collaboration message that is sent by the network computer through the real-time collaboration channel, where the real-time collaboration message is sent when the network computer determines that the operation instruction is an operation instruction used to instruct that a call be initiated, and is used to instruct the apparatus to initiate media negotiation with the communication device;

performing media negotiation with the communication device through the network computer, so as to determine a media attribute parameter that is used to transmit a media stream between the apparatus and the communication device, where information used for the media negotiation is transmitted between the apparatus and the network computer through the real-time collaboration channel; and transmitting a media stream mutually with the communication device according to the media attribute parameter determined through the media negotiation.

In a first possible implementation manner, the application program stored by the memory further includes an instruction that can be used to enable the processor to execute a process of establishing a real-time collaboration channel between the apparatus and the network computer, which is specifically an instruction of executing the following process:

establishing a WebSocket channel between the apparatus and the network computer through a web socket WebSocket server; or, establishing a second VDI channel between the apparatus and the network computer; or, establishing a point-to-point data channel between a browser in the apparatus and a browser in the network computer by using a data channel mechanism in a browser web real-time communication WebRTC application of the apparatus.

With reference to the ninth aspect or the first possible implementation manner of the ninth aspect, in a second possible implementation manner, in the application program stored by the memory, an instruction which can be used to enable the processor to execute a process of performing, through the network computer, media negotiation with the communication device, so as to determine a media attribute parameter that is used to transmit a media stream between the apparatus and the communication device is specifically an instruction of executing the following processes:

obtaining a first media attribute parameter supported by the apparatus, where the first media attribute parameter includes a media format supported by the apparatus, and an IP address and a port number that are used to receive media;

sending the first media attribute parameter to the network computer through the real-time collaboration channel, so as to enable the network computer to send a connection request message carrying the first media attribute parameter to the communication device to be called; and receiving, a second media attribute parameter that is received by the network computer from the communication device and is sent by the network computer through the real-time collaboration channel, where the second media attribute parameter includes an IP address and a port number of the communication device that are used to receive media, and a media format that is supported by both the apparatus and the communication device and is determined by the communication device according to the first media attribute parameter, where, in the application program stored by the memory, an instruction that can be used to enable the processor to execute a process of transmitting a media stream mutually with the communication device according to the media attribute parameter determined through the media negotiation is specifically an instruction of executing the following process:

sending first media to the communication device by using the IP address and the port number of the communication device that are used to receive media, and receiving second media that is sent by the communication device by using the IP address and the port number of the apparatus that are used to receive media, where both the first media and the second media are encoded by adopting the media format included in the second media attribute parameter.

With reference to the ninth aspect or the second possible implementation manner of the ninth aspect, in a third possible implementation manner, in the application program stored by the memory, an instruction that can be used to enable the processor to execute a process of obtaining a first media attribute parameter supported by the apparatus is specifically an instruction of executing the following processes:

invoking a new peer connection interface function in a browser application programming interface API of the apparatus; and generating a peer connection interface by using the new peer connection interface function, and obtaining, by using a create offer function included in the peer connection interface, the first media attribute parameter supported by the apparatus.

According to a tenth aspect, an embodiment of the present invention provides an apparatus for transmitting a media stream, where the apparatus is allocated by a cloud server to an access terminal, and a first virtualized desktop infrastructure VDI channel is established between the apparatus and the access terminal, where the apparatus includes:

a network interface;

a processor; and a memory, where the network interface is configured to perform interaction communication with the access terminal, a WebRTC server and a communication device; and the memory is configured to store an application program, where the application program includes an instruction that can be used to enable the processor to execute the following processes:

establishing a real-time collaboration channel between the apparatus and the access terminal;

receiving an operation instruction that is input by a user and is sent by the access terminal through the first VDI channel;

when it is determined that the operation instruction is an operation instruction used to instruct that a call be initiated, sending a real-time collaboration message to the access terminal through the real-time collaboration channel, where the real-time collaboration message is used to instruct the access terminal to initiate media negotiation with the communication device; and forwarding information used to perform media negotiation between the access terminal and the communication device, to enable the access terminal and the communication device to determine, through the media negotiation, a media attribute parameter that is used to transmit a media stream between the access terminal and the communication device, so that the access terminal transmits a media stream mutually with the communication device according to the media attribute parameter determined through the media negotiation, where the information used to perform the media negotiation is transmitted between the apparatus and the access terminal through the real-time collaboration channel In a first possible implementation manner, the application program stored by the memory further includes an instruction that can be used to enable the processor to execute a process of establishing a real-time collaboration channel between the apparatus and the access terminal, which is specifically an instruction of executing the following process:

establishing a WebSocket channel between the apparatus and the access terminal through a web socket WebSocket server; or, establishing a second VDI channel between the apparatus and the access terminal; or, establishing a point-to-point data channel between a browser in the apparatus and a browser in the access terminal by using a data channel mechanism in a browser web real-time communication WebRTC application of the apparatus.

With reference to the tenth aspect or the first possible implementation manner of the tenth aspect, in a second possible implementation manner, in the application program stored by the memory, an instruction that can be used to enable the processor to execute a process of forwarding information used to perform media negotiation between the access terminal and the communication device, to enable the access terminal and the communication device to determine, through the media negotiation, a media attribute parameter that is used to transmit a media stream between the access terminal and the communication device is specifically an instruction of executing the following processes:

receiving a first media attribute parameter that is supported by the access terminal and is sent by the access terminal through the real-time collaboration channel, where the first media attribute parameter includes a media format supported by the access terminal, and an IP address and a port number that are used to receive media;

sending a connection request message to the communication device according to the operation instruction that is input by the user and used to instruct that a call be initiated, where the connection request message includes the first media attribute parameter;

receiving a connect reply message that is sent by the communication device when the communication device determines that the communication device supports the first media attribute parameter, where the connect reply message includes a second media attribute parameter supported by the communication device, and the second media attribute parameter includes an IP address and a port number of the communication device that are used to receive media, and a media format that is supported by both the access terminal and the communication device and is determined by the communication device according to the first media attribute parameter; and sending the second media attribute parameter to the access terminal through the real-time collaboration channel, so that the access terminal sends first media to the communication device by using the IP address and the port number of the communication device that are used to receive media, and receives second media that is sent by the communication device by using the IP address and the port number of the access terminal that are used to receive media, where both the first media and the second media are encoded by adopting the media format included in the second media attribute parameter.

With reference to the tenth aspect or the second possible implementation manner of the tenth aspect, in a third possible implementation manner, the application program stored by the memory further includes an instruction that can be used to enable the processor to execute the following processes:

invoking a WebRTC signaling message protocol stack; and performing encapsulation processing on the first media attribute parameter by using the signaling message protocol stack, to generate the connection request message, where the connection request message includes the first media attribute parameter.

According to an eleventh aspect, an embodiment of the present invention provides an apparatus for transmitting a media stream, where a first virtualized desktop infrastructure VDI channel is established between the apparatus and a network computer allocated by a cloud server to the apparatus, where the apparatus includes:

a network interface;

a processor; and a memory, where the network interface is configured to perform interaction communication with the network computer; and the memory is configured to store an application program, where the application program includes an instruction that can be used to enable the processor to execute the following processes:

establishing a real-time collaboration channel between the apparatus and the network computer;

receiving a real-time collaboration message that is sent by the network computer through the real-time collaboration channel, where the real-time collaboration message is sent by the network computer when the network computer receives a call request that is sent by a communication device and used to call a user corresponding to the apparatus, and the real-time collaboration message includes a first media attribute parameter that is supported by the communication device and is obtained by the network computer by parsing the call request, and is used to instruct the apparatus to perform media negotiation with the communication device according to the first media attribute parameter supported by the communication device;

performing media negotiation with the communication device through the network computer, so as to determine a media attribute parameter that is used to transmit a media stream between the apparatus and the communication device, where information used for the media negotiation is transmitted between the apparatus and the network computer through the real-time collaboration channel; and transmitting a media stream mutually with the communication device according to the media attribute parameter determined through the media negotiation.

In a first possible implementation manner, in the application program stored by the memory, an instruction that can be used to enable the processor to execute a process of establishing a real-time collaboration channel between the apparatus and the network computer is specifically an instruction of executing the following process:

establishing a WebSocket channel between the apparatus and the network computer through a web socket WebSocket server; or, establishing a second VDI channel between the apparatus and the network computer; or, establishing a point-to-point data channel between a browser in the apparatus and a browser in the network computer by using a data channel mechanism in a browser web real-time communication WebRTC application of the apparatus.

With reference to the eleventh aspect or the first possible implementation manner of the eleventh aspect, in a second possible implementation manner, the first media attribute parameter includes a media format supported by the communication device, and an IP address and a port number that are used to receive media;

in the application program stored by the memory, an instruction which that can be used to enable the processor to execute a process of performing media negotiation with the communication device through the network computer, so as to determine a media attribute parameter that is used to transmit a media stream between the apparatus and the communication device is specifically an instruction of executing the following processes:

determining a second media attribute parameter supported by the apparatus according to the first media attribute parameter, where the second media attribute parameter includes an IP address and a port number of the apparatus that are used to receive media, and a media format that is supported by both the apparatus and the communication device and is determined by the apparatus according to the first media attribute parameter; and sending the second media attribute parameter to the network computer through the real-time collaboration channel, so as to enable the network computer to forward the second media attribute parameter to the communication device, where, in the application program stored by the memory, an instruction that can be used to enable the processor to execute a process of transmitting a media stream mutually with the communication device according to the media attribute parameter determined through the media negotiation is specifically an instruction of executing the following process:

sending first media to the communication device by using the IP address and the port number of the communication device that are used to receive media, and receiving second media that is sent by the communication device by using the IP address and the port number of the apparatus that are used to receive media, where both the first media and the second media are encoded by adopting the media format included in the second media attribute parameter.

With reference to the eleventh aspect or the second possible implementation manner of the eleventh aspect, in a third possible implementation manner, in the application program stored by the memory, an instruction that can be used to enable the processor to execute a process of determining the second media attribute parameter according to the first media attribute parameter is specifically an instruction of executing the following processes:

invoking a new peer connection interface function in a browser application programming interface API of the apparatus; and generating a peer connection interface by using the new peer connection interface function, and obtaining the second media attribute parameter by using a create answer function included in the peer connection interface.

According to a twelfth aspect, an embodiment of the present invention provides an apparatus for transmitting a media stream, where a first virtualized desktop infrastructure VDI channel is established between the apparatus and the access terminal, and the apparatus is allocated by a cloud server to the access terminal, where the apparatus includes:

a network interface;

a processor; and a memory, where the network interface is configured to perform interaction communication with the access terminal, a WebRTC server and a communication device; and the memory is configured to store an application program, where the application program includes an instruction that can be used to enable the processor to execute the following processes:

establishing a real-time collaboration channel between the apparatus and the access terminal;

receiving a call request that is sent by the communication device and used to call a user corresponding to the access terminal;

sending, according to the call request, a real-time collaboration message to the access terminal through the real-time collaboration channel, where the real-time collaboration message includes a first media attribute parameter that is supported by the communication device and is obtained by the apparatus by parsing the call request, and is used to instruct the access terminal to perform media negotiation with the communication device according to the first media attribute parameter supported by the communication device; and forwarding information used to perform media negotiation between the access terminal and the communication device, to enable the access terminal and the communication device to determine, through the media negotiation, a media attribute parameter that is used to transmit a media stream between the access terminal and the communication device, so that the access terminal transmits a media stream mutually with the communication device according to the media attribute parameter determined through the media negotiation, where the information used to perform the media negotiation is transmitted between the apparatus and the access terminal through the real-time collaboration channel In a first possible implementation manner, in the application program stored by the memory, an instruction that can be used to enable the processor to execute a process of establishing a real-time collaboration channel between the apparatus and the access terminal is specifically an instruction of executing the following process:

establishing a WebSocket channel between the apparatus and the access terminal through a web socket WebSocket server; or, establishing a second VDI channel between the apparatus and the access terminal; or, establishing a point-to-point data channel between a browser in the apparatus and a browser in the access terminal by using a data channel mechanism in a browser web real-time communication WebRTC application of the apparatus.

With reference to the twelfth aspect or the first possible implementation manner of the twelfth aspect, in a second possible implementation manner, the first media attribute parameter includes a media format supported by the communication device, and an IP address and a port number that are used to receive media; and in the application program stored by the memory, an instruction that can be used to enable the processor to execute a process of forwarding information used to perform media negotiation between the access terminal and the communication device, to enable the access terminal and the communication device to determine, through the media negotiation, a media attribute parameter that is used to transmit a media stream between the access terminal and the communication device is specifically an instruction of executing the following processes:

receiving a second media attribute parameter that is sent by the access terminal through the real-time collaboration channel, where the second media attribute parameter includes an IP address and a port number of the access terminal that are used to receive media, and a media format that is supported by both the access terminal and the communication device and is determined by the access terminal according to the first media attribute parameter; and forwarding the second media attribute parameter to the communication device, so that the communication device sends first media to the access terminal by using the IP address and the port number of the access terminal that are used to receive media, and receives second media that is sent by the access terminal by using the IP address and the port number of the communication device that are used to receive media, where both the first media and the second media are encoded by adopting the media format included in the second media attribute parameter.

With reference to the twelfth aspect or the second possible implementation manner of the twelfth aspect, in a third possible implementation manner, the application program stored by the memory further includes an instruction that can be used to enable the processor to execute the following processes:

invoking a WebRTC signaling message protocol stack;

performing encapsulation processing on the second media attribute parameter by using the signaling message protocol stack, to generate a call response; and sending the call response to the communication device, where the call response includes the second media attribute parameter.

According to a thirteenth aspect, an embodiment of the present invention provides a system for transmitting a media stream, where the system includes the apparatus for transmitting a media stream provided in the fifth aspect and the sixth aspect of the present invention;

or, the apparatus for transmitting a media stream provided in the seventh aspect and the eighth aspect of the present invention.

According to a fourteenth aspect, an embodiment of the present invention provides a system for transmitting a media stream, where the system includes the apparatus for transmitting a media stream provided in the ninth aspect and the tenth aspect of the present invention;

or, the apparatus for transmitting a media stream provided in the eleventh aspect and the twelfth aspect of the present invention.

Therefore, by applying the method and the apparatus for transmitting a media stream provided in the embodiments of the present invention, an access terminal receives, through a real-time collaboration channel established to a network computer, a real-time collaboration message that is sent by the network computer, initiates, through the network computer, media negotiation with a communication device according to the real-time collaboration message, and transmits a media stream mutually with the communication device according to a media attribute parameter determined through the media negotiation. Because of the technical characteristics that the access terminal exchanges the media attribute parameter with the communication device through the network computer, to complete the media negotiation between the access terminal and the communication device, and the access terminal transmits the media stream to the communication device, the access terminal and the communication device can directly transmit the media stream to each other, and no longer perform transmission by using the NC, thereby avoiding the problems in the prior art that the delay of the media stream is obvious and communication quality is reduced because the NC needs to perform conversion and transmission on media data, and bandwidth occupancy between a TC/PC and the NC is increased and bandwidth is wasted because a media stream needs to be transferred back and forth between the TC/PC and the NC through a VDI channel Therefore, the delay of the media stream is reduced, and the bandwidth is saved.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the embodiments to be described are a part rather than all of the embodiments of the present invention. All other embodiments obtained by a person of ordinary skill in the art based on the embodiments of the present invention without creative efforts shall fall within the protection scope of the present invention.

To facilitate understanding of the embodiments of the present invention, the following further describes specific embodiments with reference to the accompanying drawings. The embodiments do not constitute any limitation to the embodiments of the present invention.

Embodiment 1

Figure 1:
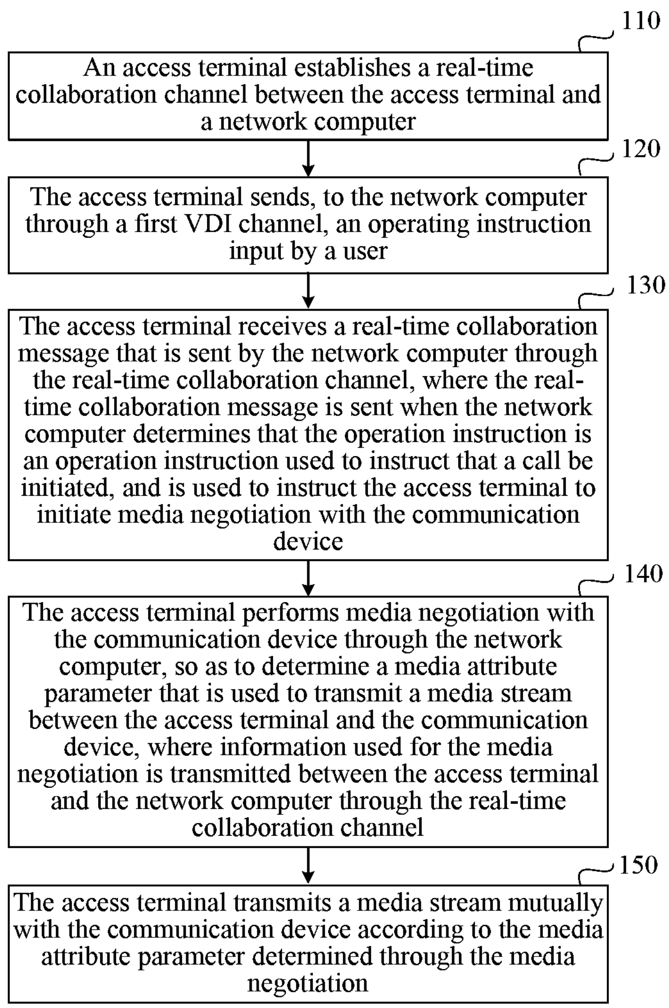
FIG. 1 is a flowchart of a method for transmitting a media stream according to Embodiment 1 of the present invention.

The following describes in detail a method for transmitting a media stream provided in Embodiment 1 of the present invention by using FIG. 1 as an example. FIG. 1 is a flowchart of a method for transmitting a media stream according to Embodiment 1 of the present invention. The embodiment of the present invention is implemented by an access terminal of an initiator, and in the embodiment of the present invention, the access terminal of the initiator may specifically be a desktop cloud terminal. A first VDI channel is established between the access terminal and a network computer allocated by a cloud server to the access terminal. As shown in FIG. 1, the embodiment specifically includes the following steps:

Step 110: The access terminal establishes a real-time collaboration channel between the access terminal and the network computer.

Specifically, the access terminal establishes the real-time collaboration channel between the access terminal and the network computer NC (for example, NC1).

Before step 110 is executed, the access terminal establishes a first VDI channel between the access terminal and NC1, where the first VDI channel transmits data input by a user application interface and by a user by using a device such as a keyboard and a mouse. That the access terminal establishes a first VDI channel between the access terminal and NC1 is the prior art, which is not repeated again herein.

Further, in the embodiment of the present invention, the establishing, by the access terminal, the real-time collaboration channel between the access terminal and NC1 specifically includes:

establishing, by the access terminal, a WebSocket channel between the access terminal and NC1 through a web socket WebSocket server, where the established WebSocket channel is used to transmit a real-time collaboration message; or, after establishing the first VDI channel between the access terminal and NC1 (the first VDI channel is used to transmit data input by a user application interface and by a user by using a device such as a keyboard and a mouse), establishing, by the access terminal, a second VDI channel according to the ICA protocol, where the established second VDI channel is used to transmit a real-time collaboration message; or, establishing, by the access terminal, a point-to-point data channel between a browser in the access terminal and a browser in NC1 by using a data channel mechanism in a browser web real-time communication WebRTC application of the access terminal, where the point-to-point data channel is used to transmit a real-time collaboration message.

Step 120: The access terminal sends, to the network computer through the first VDI channel, an operation instruction input by a user.

Specifically, the access terminal receives, through the first VDI channel, and displays a user application interface transmitted by a network computer NC (for example, NC1), where NC1 is specifically allocated by a cloud server to the access terminal. A user performs an operation on the user application interface on the access terminal, and when the user expects to initiate a call to a communication device (for example, call a mobile phone of a certain user or call a certain conference server to join a conference), the user inputs, by using an input device such as a keyboard and a mouse, an operation instruction used to instruct that a communication device be called, for example, clicks a "Call" button or clicks a "Join Conference" button by using a mouse. The access terminal sends the operation instruction to NC1 through the first VDI channel.

Step 130: The access terminal receives a real-time collaboration message that is sent by the network computer through the real-time collaboration channel, where the real-time collaboration message is sent when the network computer determines that the operation instruction is an operation instruction used to instruct that a call be initiated, and is used to instruct the access terminal to initiate media negotiation with the communication device.

Specifically, after NC1 receives, through the first VDI channel, the operation instruction input by the user, NC1 parses the operation instruction, and determines that the user expects to initiate a call to the communication device, for example, determines, according to the operation instruction, that an operation of clicking the "Call" button triggers the operation instruction. NC1 sends the real-time collaboration message to the access terminal through the real-time collaboration channel established in step 110, and the access terminal receives the real-time collaboration message sent by NC1, where the real-time collaboration message is used to instruct the access terminal to initiate media negotiation with the communication device.

Step 140: The access terminal performs media negotiation with the communication device through the network computer, so as to determine a media attribute parameter that is used to transmit a media stream between the access terminal and the communication device, where information used for the media negotiation is transmitted between the access terminal and the network computer through the real-time collaboration channel Specifically, the access terminal initiates the media negotiation to the communication device according to the received real-time collaboration message.

Further, in this step, the performing, by the access terminal through the network computer, media negotiation with the communication device to determine a media attribute parameter that is used to transmit a media stream between the access terminal and the communication device specifically includes:

obtaining, by the access terminal, a first media attribute parameter supported by the access terminal itself, where the first media attribute parameter includes a media format supported by the access terminal itself and an IP address and a port number that are used to receive media; sending, by the access terminal, the first media attribute parameter to NC1 through the real-time collaboration channel, so as to enable NC1 to send a connection request message carrying the first media attribute parameter to the communication device; and receiving, by the access terminal, a second media attribute parameter that is sent by NC1 through the real-time collaboration channel and received by NC1 from the communication device, where the second media attribute parameter includes an IP address and a port number of the communication device that are used to receive media, and a media format that is supported by both the access terminal and the communication device and is determined by the communication device according to the first media attribute parameter.

Further, in this step, the obtaining, by the access terminal, a first media attribute parameter supported by the access terminal specifically includes:

invoking, by the access terminal, a new peer connection interface function webkitRTCPeerConnection( ) in a browser application programming interface (API for short) of the access terminal itself; and generating, by the access terminal, a peer connection interface peerConnection interface by using the webkitRTCPeerConnection( ) function, where in the embodiment of the present invention, a technology based on web real-time communication (Web Real Time Communication, WebRTC for short) is applied to a desktop cloud system. The peerConnection interface defines a related method for performing WebRTC media negotiation with the communication device, and the access terminal obtains, by using a create offer function createOffer( )included in the peerConnection interface, the first media attribute parameter supported by the access terminal.

It may be understood that, when performing communication interaction with the communication device, NC1 needs to forward a communication message through a WebRTC server.

The communication device receives the connection request message sent by NC1, parses the connection request message and extracts the first media attribute parameter included in the connection request message. When the communication device determines that the communication device supports the first media attribute parameter, the communication device sends a connect reply message to NC1, and NC1 receives the connect reply message, where the connect reply message includes the second media attribute parameter that is supported by the communication device and determined by the communication device according to the first media attribute parameter.

The obtaining, by the communication device, a second media attribute parameter specifically is: invoking, by the communication device according to the connection request message, a new peer connection interface function webkitRTCPeerConnection( ) in a browser application programming interface (API for short) of the communication device; and generating, by the communication device, a peer connection interface peerConnection interface by using the webkitRTCPeerConnection( ), and obtaining, by using a create answer function createAnswer( ) included in the peerConnection interface, the second media attribute parameter supported by the communication device.

The obtaining, by the communication device, a second media attribute parameter supported by the access terminal is implemented specifically through the following steps: obtaining, by the communication device, a third media attribute parameter by using creatAnswer( ), where the third media attribute parameter specifically includes all media attribute parameters supported by the communication device; and selecting, by the communication device from the third media attribute parameter according to the first media attribute parameter, one or more media attribute parameters same as the first media attribute parameter as the second media attribute parameters supported by the communication device.

Step 150: The access terminal transmits a media stream mutually with the communication device according to the media attribute parameter determined through the media negotiation.

Specifically, the access terminal transmits the media stream mutually with the communication device by using the media attribute parameter determined through media negotiation with the communication device.

Further, in this step, the transmitting, by the access terminal, a media stream mutually with the communication device according to the media attribute parameter determined through the media negotiation specifically includes:

sending, by the access terminal, first media to the communication device by using the IP address and the port number of the communication device that are used to receive media, and receiving second media that is sent by the communication device by using the IP address and the port number of the access terminal that are used to receive media, where both the first media and the second media are encoded by adopting the media format included in the second media attribute parameter.

In this step, when the access terminal transmits media mutually with the communication device, the access terminal further sends a connection success message to NC1, and then the access terminal transmits media mutually with the communication device. Video and audio conversation may be performed between users.

Optionally, in the embodiment of the present invention, before the establishing, by the access terminal, a real-time collaboration channel between the access terminal and the network computer in step 110, the method further includes a step: The access terminal receives a HyperText Markup Language HTML webpage, obtains a media control application from the HTML webpage, and configures the media control application into the access terminal. Through the foregoing step, the access terminal may be provided with the media control application, and the access terminal completes the foregoing step 110 to step 150 by using the media control application. The specific step is as follows:

receiving, by the access terminal, a HyperText Markup Language HTML webpage that is sent by a web interface module in an application server by invoking a configuration file, where the HTML webpage includes the media control application; and obtaining, by the access terminal, the media control application through the HTML webpage, and configuring the media control application into the access terminal, so that the access terminal completes, by using the media control application, transmitting the real-time collaboration message and information used for the media negotiation to the network computer, further obtains the first media attribute parameter through the media control application, further performs media negotiation with the communication device by using the media control application, and transmits a media stream mutually with the communication device according to the media attribute parameter determined through the media negotiation.

Specifically, after the access terminal accesses a desktop cloud system, the access terminal receives the HTML webpage that is sent by the web interface (Web Interface) module in the application server by invoking the configuration file, where the HTML webpage includes the media control application. The access terminal obtains the media control application through the HTML webpage, and configures the media control application locally, and the access terminal completes the functions described in the foregoing step 110 to step 150 by using the media control application.

In the embodiment of the present invention, a user first accesses the web interface module of the application server in the desktop cloud system by using the access terminal, thereby accessing the desktop cloud system. The web interface module is connected to a resource pool of the desktop cloud system, where the resource pool includes a desktop scheduling center and a WebRTC media control entity, and the resource pool further stores a resource list required by the user, where the resource list required by the user stores the media control application. When a user accesses the web interface module by using the access terminal, the web interface module accesses the resource list of the user in the resource pool, and obtains a resource and a media control application that are required by the user according to a user configuration and a user attribute. The web interface module sets the layout and tag attributes of the HTML webpage in a configuration console, so that the obtained resource and media control application are laid out in the same HTML webpage, and the HTML webpage is sent to the access terminal. The access terminal displays the HTML webpage, the access terminal downloads, according to the operation of the user for the HTML webpage, the media control application locally through the HTML webpage, and meanwhile, the access terminal accesses the desktop cloud system by using the web interface module, and establishes a connection to the cloud server through the desktop scheduling center according to an instruction input by the user.

It may be understood that, before the access terminal accesses the desktop cloud system, an administrator further configures the resource pool, that is, the administrator places the media control application into the resource pool, modifies a configuration file of the resource list required by the user, and stores the media control application into the resource list required by the user. Further, the user may also modify the configuration file of the resource list required by the user, and store the media control application into the resource list required by the user.

Optionally, in the embodiment of the present invention, the method further includes a step: If the communication device determines that the communication device does not support the first media attribute parameter, the access terminal receives a connection failure message forwarded by NC1 and sent by the communication device. Through the step, the access terminal no longer transmits the media stream mutually with the communication device. The specific step is as follows:

after determining that the communication device does not support the first media attribute parameter, no longer determining, by the communication device according to the first media attribute parameter, the second media attribute parameter supported by the communication device, generating, by the communication device, a connection failure message, and forwarding the connection failure message to NC1 through the WebRTC server, so that NC1 sends the connection failure message to the access terminal, and the access terminal determines, according to the connection failure message, that the communication device does not support the first media attribute parameter, and no longer transmits the media stream mutually with the communication device.

In the embodiment of the present invention, that the communication device does not support the first media attribute parameter specifically refers to that the media attribute parameter supported by the communication device does not match the first media attribute parameter, so that the communication device does not support the first media attribute parameter.

In the embodiment of the present invention, the access terminal specifically is a terminal that can access a desktop cloud system, such as a PC/TC. The communication device differs in different current environments, and the communication device specifically is a desktop cloud terminal, a media access device, a conference server, or the like.

Therefore, by applying the method for transmitting a media stream provided in the embodiment of the present invention, an access terminal receives, through a real-time collaboration channel established to a network computer, a real-time collaboration message that is sent by the network computer, initiates, through the network computer, media negotiation with a communication device according to the real-time collaboration message, and transmits a media stream mutually with the communication device according to a media attribute parameter determined through the media negotiation. Because of the technical characteristics that the access terminal exchanges the media attribute parameter with the communication device through the network computer, to complete the media negotiation between the access terminal and the communication device, and the access terminal transmits the media stream to the communication device, the access terminal and the communication device can directly transmit the media stream to each other, and no longer perform transmission by using the NC, thereby avoiding the problems in the prior art that the delay of the media stream is obvious and communication quality is reduced because the NC needs to perform conversion and transmission on media data, and bandwidth occupancy between a TC/PC and the NC is increased and bandwidth is wasted because a media stream needs to be transferred back and forth between the TC/PC and the NC through a VDI channel Therefore, the delay of the media stream is reduced, and the bandwidth is saved.

Figure 2:
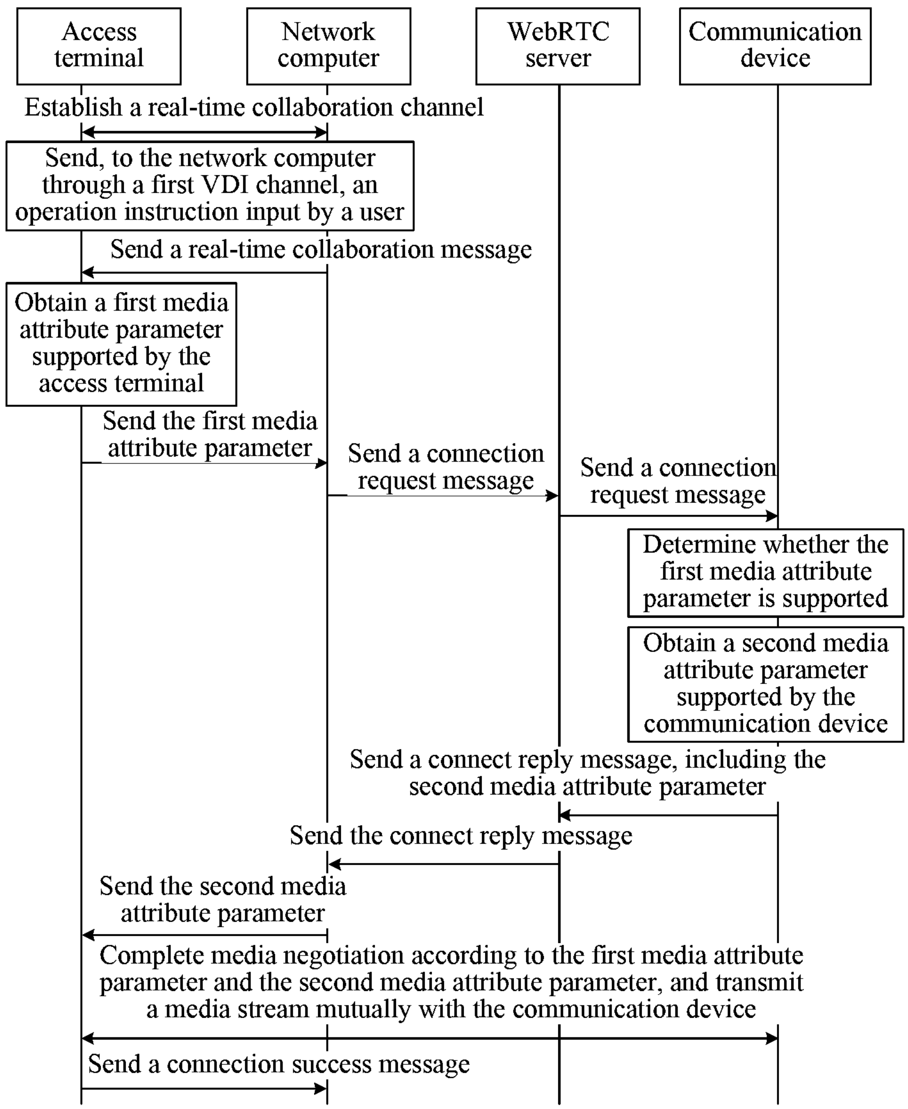
FIG. 2 is a signaling diagram of a method for transmitting a media stream according to an embodiment of the present invention.

Further, FIG. 2 is a signaling diagram of a method for transmitting a media stream according to an embodiment of the present invention. The signaling diagram shown in FIG. 2 is a processing process for an access terminal to transmit a media stream to a communication device. The method for transmitting a media stream in FIG. 2 may be executed according to the process described in the foregoing embodiment.

As shown in FIG. 2, the access terminal establishes a real-time collaboration channel between the access terminal and a network computer allocated by a cloud server to the access terminal, the access terminal sends, through a first VDI channel to the network computer, an operation instruction input by a user, and after determining that the operation instruction is an operation instruction used to instruct that a call be initiated, the network computer sends a real-time collaboration message to the access terminal, where the real-time collaboration message is used to instruct the access terminal to initiate media negotiation with the communication device.

The access terminal obtains a first media attribute parameter supported by the access terminal. The access terminal sends the first media attribute parameter to the network computer through the real-time collaboration channel, so as to enable the network computer to send a connection request message carrying the first media attribute parameter to the communication device to be called through a WebRTC server, and further to enable the communication device to determine whether the communication device supports the first media attribute parameter.

When the communication device determines that the communication device supports the first media attribute parameter, the communication device obtains a second media attribute parameter supported by the communication device, and sends a connect reply message to the network computer through the WebRTC server, where the connect reply message includes the second media attribute parameter.

The access terminal receives the second media attribute parameter that is sent by the network computer through the real-time collaboration channel The access terminal completes the media negotiation according to the first media attribute parameter and the second media attribute parameter, transmits a media stream mutually with the communication device, and sends a connection success message to the network computer.

Figure 3:
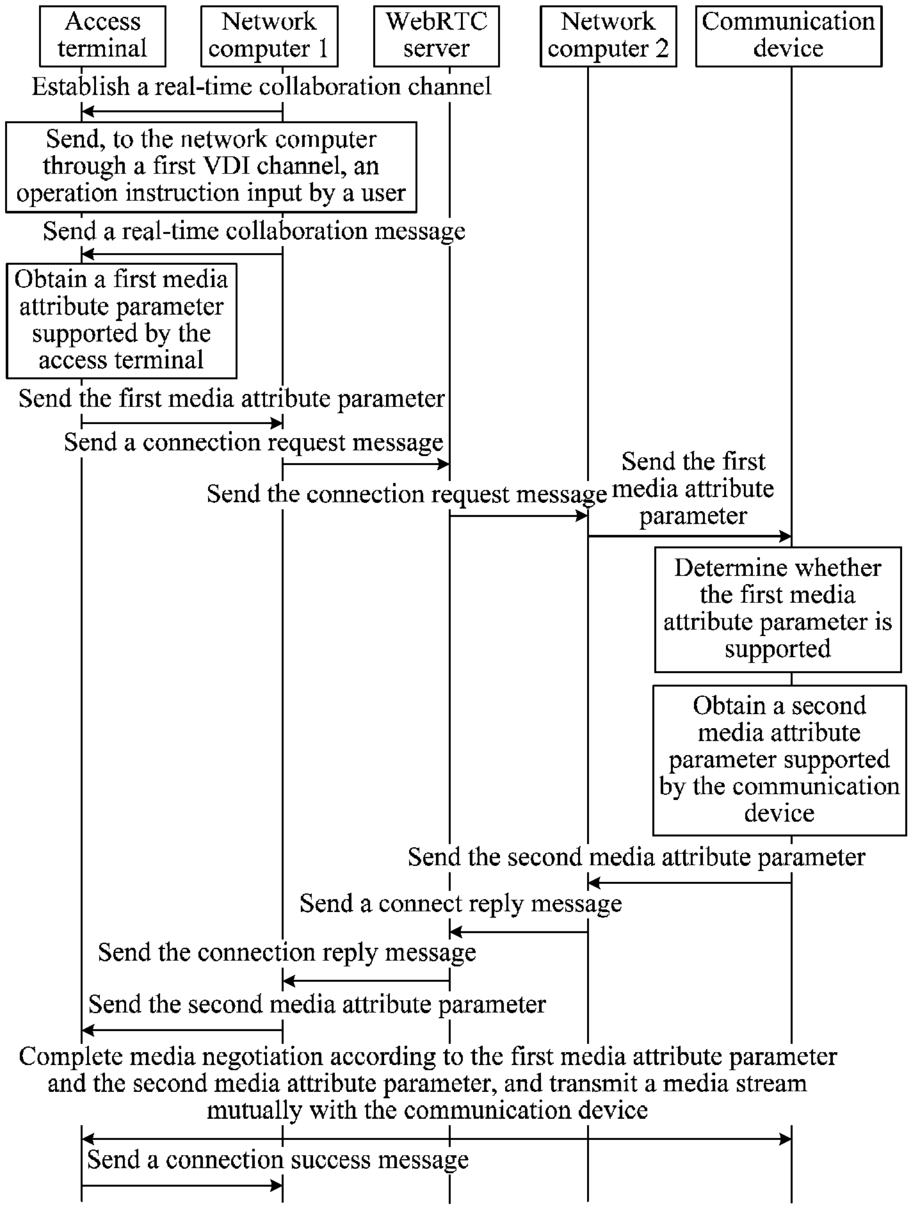
FIG. 3 is a signaling diagram of another method for transmitting a media stream according to an embodiment of the present invention.

Further, the communication device in the signaling diagram shown in FIG. 2 is specifically a desktop cloud terminal, a media access device, a conference server, or the like. In the embodiment of the present invention, when the communication device is also a desktop cloud terminal, as shown in FIG. 3, a signaling diagram shown in FIG. 3 is a processing process for the access terminal to transmit a media stream to the communication device, the communication device is also correspondingly connected to a certain network computer allocated by the cloud server to the communication device, and the inside of the communication device also includes a media control application. The working principle and the working process of the media control application in the communication device are the same as those of the media control application in the access terminal, which are not repeated again herein.

Embodiment 2

Figure 4:
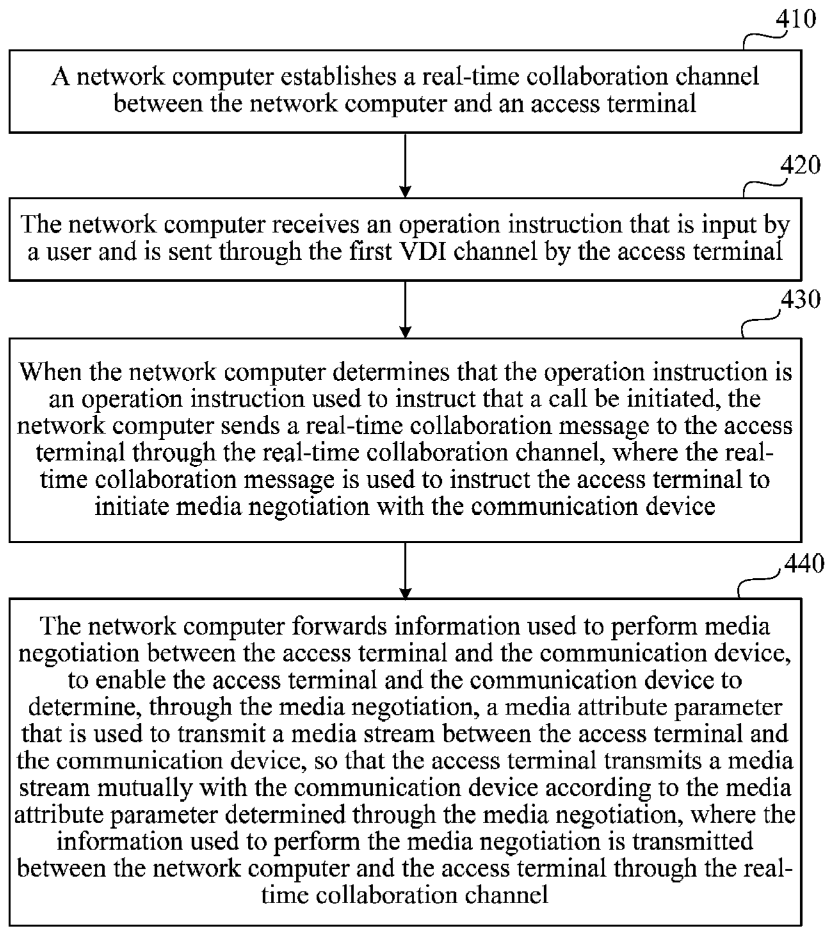
FIG. 4 is a flowchart of a method for transmitting a media stream according to Embodiment 2 of the present invention.

The following describes in detail a method for transmitting a media stream provided in Embodiment 2 of the present invention by using FIG. 4 as an example. FIG. 4 is a flowchart of a method for transmitting a media stream according to Embodiment 2 of the present invention. The embodiment of the present invention is implemented by a network computer in a cloud server. A first VDI channel is established between the network computer and an access terminal, and as shown in FIG. 4, the embodiment specifically includes the following steps:

Step 410: The network computer establishes a real-time collaboration channel between the network computer and the access terminal.

Specifically, the network computer NC (for example, NC1) establishes the real-time collaboration channel between the network computer and the access terminal.

Before step 410 is executed, NC1 establishes a first VDI channel between NC1 and the access terminal, where the VDI channel transmits data input by a user application interface and by a user by using a device such as a keyboard and a mouse. That NC1 establishes a first VDI channel between NC1 and the access terminal is the prior art, which is not repeated again herein.

Further, in the embodiment of the present invention, the establishing, by NC1, the real-time collaboration channel between NC1 and the access terminal specifically includes:

establishing, by NC1, a WebSocket channel between NC1 and the access terminal through a web socket WebSocket server; or, after establishing the first VDI channel between NC1 and the access terminal (the first VDI channel is used to transmit data input by a user application interface and by a user by using a device such as a keyboard and a mouse), establishing, by NC1, a second VDI channel according to the ICA protocol; or, establishing, by NC1, a point-to-point data channel between a browser in NC1 and a browser in the access terminal by using a data channel mechanism in a browser web real-time communication WebRTC application of NC1.

Step 420: The network computer receives an operation instruction that is input by a user and is sent by the access terminal through the first VDI channel Specifically, NC1 allocated by the cloud server to the access terminal receives, through the first VDI channel, the operation instruction that is input by the user and sent by the access terminal.

The access terminal accesses the desktop cloud system, NC1 transmits the user application interface to the access terminal through the first VDI channel, the access terminal receives and displays the user application interface transmitted by NC1, and the user operates the user application interface. When the user expects to establish a video and audio call to a user corresponding to the communication device (for example, call a mobile phone of a certain user or call a certain conference server to join a conference), the user inputs, by using an input device such as a keyboard and a mouse, an operation instruction used to instruct that the communication device be called, for example, clicks the "Call" button or clicks the "Join Conference" button by using a mouse. NC1 receives, through the first VDI channel, the operation instruction sent by the access terminal.

Step 430: When the network computer determines that the operation instruction is an operation instruction used to instruct that a call be initiated, the network computer sends a real-time collaboration message to the access terminal through the real-time collaboration channel, where the real-time collaboration message is used to instruct the access terminal to initiate media negotiation with the communication device.

Specifically, when NC1 receives, through the first VDI channel, the operation instruction input by the user, NC1 parses the operation instruction, and determines that the user expects to initiate a call to the communication device, for example, determines, according to the operation instruction, that the operation of clicking the "Call" button triggers the operation instruction. NC1 sends the real-time collaboration message to the access terminal through the real-time collaboration channel established in step 410, where the real-time collaboration message is sent when NC1 determines that the operation instruction is an operation instruction used to instruct that a call be initiated, and is used to instruct the access terminal to initiate media negotiation with the communication device.

Step 440: The network computer forwards information used to perform media negotiation between the access terminal and the communication device, to enable the access terminal and the communication device to determine, through the media negotiation, a media attribute parameter that is used to transmit a media stream between the access terminal and the communication device, so that the access terminal transmits a media stream mutually with the communication device according to the media attribute parameter determined through the media negotiation, where the information used to perform the media negotiation is transmitted between the network computer and the access terminal through the real-time collaboration channel Specifically, the access terminal initiates the media negotiation to the communication device according to the received real-time collaboration message. NC1 forwards information used to perform media negotiation between the access terminal and the communication device, to enable the access terminal and the communication device to determine, through the media negotiation, a media attribute parameter that is used to transmit a media stream between the access terminal and the communication device, so that the access terminal transmits the media stream mutually with the communication device according to the media attribute parameter determined through the media negotiation, where the information used to perform media negotiation is transmitted between NC1 and the access terminal through the real-time collaboration channel established in step 410.

Further, in this step, the forwarding, by the network computer, information used to perform media negotiation between the access terminal and the communication device, to enable the access terminal and the communication device to determine, through the media negotiation, a media attribute parameter that is used to transmit a media stream between the access terminal and the communication device specifically includes:

receiving, by NC1, a first media attribute parameter that is supported by the access terminal and is sent by the access terminal through the real-time collaboration channel, where the first media attribute parameter includes a media format supported by the access terminal, and an IP address and a port number that are used to receive a media; sending, by NC1, a connection request message to the communication device according to the operation instruction that is input by the user and used to instruct that the communication device be called, where the connection request message includes the first media attribute parameter; receiving, by NC1, a connect reply message that is sent by the communication device when the communication device determines that the communication device supports the first media attribute parameter, where the connect reply message includes a second media attribute parameter supported by the communication device, and the second media attribute parameter includes an IP address and a port number of the communication device that are used to receive media, and a media format that is supported by both the access terminal and the communication device and is determined by the communication device according to the first media attribute parameter; and sending, by NC1, the second media attribute parameter to the access terminal through the real-time collaboration channel, so that the access terminal sends first media to the communication device by using the IP address and the port number of the communication device that are used to receive media, and receives second media that is sent by the communication device by using the IP address and the port number of the access terminal that are used to receive media, where both the first media and the second media are encoded by adopting the media format included in the second media attribute parameter.

It may be understood that, when performing communication interaction with the communication device, NC1 needs to forward a message through a WebRTC server.

In Embodiment 1, the process for the access terminal and the communication device to perform media negotiation according to the received first media attribute parameter and second media attribute parameter is described in detail, which is not repeated again herein.

Optionally, in the embodiment of the present invention, before step 420 of establishing, by the network computer, a real-time collaboration channel between the network computer and the access terminal, the method further includes a step: The access terminal accesses a desktop cloud system. In Embodiment 1, the process for the access terminal to access a desktop cloud system is described in detail, which is not repeated again herein.

Optionally, in the embodiment of the present invention, before the sending, by the network computer, a connection request message to the communication device according to the operation instruction that is input by the user and used to instruct that a call be initiated, the method further includes a step: The network computer performs encapsulation processing on the first media attribute parameter to generate a connection request message. The specific step is as follows:

invoking, by NC1, a WebRTC signaling message protocol stack; and performing, by NC1, encapsulation processing on the first media attribute parameter by using the signaling message protocol stack, to generate a connection request message, where the connection request message includes the first media attribute parameter.

It may be understood that only after performing encapsulation processing on the first media attribute parameter, NC1 may forward the encapsulated first media attribute parameter to the communication device through the WebRTC server. In the embodiment of the present invention, a message header (for example: from XX to XX) may be added to the first media attribute parameter. The added message header may enable the WebRTC server to determine a transmission path of the connection request message, so that the WebRTC server forwards the connection request message to the communication device.

Optionally, in the embodiment of the present invention, the method further includes a step: If the communication device determines that the communication device does not support the first media attribute parameter, NC1 receives a connection failure message sent by the communication device and NC1 further sends the connection failure message to the access terminal. Through the step, the access terminal no longer transmits the media stream mutually with the communication device. The specific step is as follows:

after determining that the communication device does not support the first media attribute parameter, no longer determining, by the communication device according to the first media attribute parameter, the second media attribute parameter supported by the communication device, generating, by the communication device, a connection failure message, and forwarding the connection failure message to NC1 through the WebRTC server, so that NC1 forwards the received connection failure message to the access terminal, and the access terminal determines, according to the connection failure message, that the communication device does not support the first media attribute parameter, and no longer transmits the media stream mutually with the communication device.

In the embodiment of the present invention, that the communication device does not support the first media attribute parameter specifically refers to that the media attribute parameter supported by the communication device does not match the first media attribute parameter, so that the communication device does not support the first media attribute parameter.

In the embodiment of the present invention, the access terminal specifically is a terminal that can access a desktop cloud system, such as a PC/TC. The communication device differs in different current environments, and the communication device specifically is a desktop cloud terminal, a media access device, a conference server, or the like.

Therefore, by applying the method for transmitting a media stream provided in the embodiment of the present invention, an access terminal receives, through a real-time collaboration channel established to a network computer, a real-time collaboration message that is sent by the network computer, initiates, through the network computer, media negotiation with a communication device according to the real-time collaboration message, and transmits a media stream mutually with the communication device according to a media attribute parameter determined through the media negotiation. Because of the technical characteristics that the access terminal exchanges the media attribute parameter with the communication device through the network computer, to complete the media negotiation between the access terminal and the communication device, and the access terminal transmits the media stream to the communication device, the access terminal and the communication device can directly transmit the media stream to each other, and no longer perform transmission by using the NC, thereby avoiding the problems in the prior art that the delay of the media stream is obvious and communication quality is reduced because the NC needs to perform conversion and transmission on media data, and bandwidth occupancy between a TC/PC and the NC is increased and bandwidth is wasted because a media stream needs to be transferred back and forth between the TC/PC and the NC through a VDI channel Therefore, the delay of the media stream is reduced, and the bandwidth is saved.

Further, FIG. 2 is a signaling diagram of a method for transmitting a media stream according to an embodiment of the present invention. The signaling diagram shown in FIG. 2 is a processing process for an access terminal to transmit a media stream to a communication device. The method for transmitting a media stream in FIG. 2 may be executed according to the process described in the foregoing embodiment.

As shown in FIG. 2, the access terminal establishes a real-time collaboration channel between the access terminal and a network computer allocated by a cloud server to the access terminal, the access terminal sends, through a first VDI channel to the network computer, an operation instruction input by a user, and after determining that the operation instruction is an operation instruction used to instruct that a call be initiated, the network computer sends a real-time collaboration message to the access terminal, where the real-time collaboration message is used to instruct the access terminal to initiate media negotiation with the communication device.

The access terminal obtains a first media attribute parameter supported by the access terminal. The access terminal sends the first media attribute parameter to the network computer through the real-time collaboration channel, so as to enable the network computer to send a connection request message carrying the first media attribute parameter to the communication device to be called, and further to enable the communication device to determine whether the communication device supports the first media attribute parameter.

When the communication device determines that the communication device supports the first media attribute parameter, the communication device obtains a second media attribute parameter supported by the communication device, and sends a connect reply message to the network computer, where the connect reply message includes the second media attribute parameter.

The access terminal receives the second media attribute parameter that is sent by the network computer through the real-time collaboration channel The access terminal completes the media negotiation according to the first media attribute parameter and the second media attribute parameter, transmits a media stream mutually with the communication device, and sends a connection success message to the network computer.

Further, the communication device in the signaling diagram shown in FIG. 2 is specifically a desktop cloud terminal, a media access device, a conference server, or the like. In the embodiment of the present invention, when the communication device is also a desktop cloud terminal, as shown in FIG. 3, a signaling diagram shown in FIG. 3 is a processing process for the access terminal to transmit a media stream to the communication device, the communication device is also correspondingly connected to a certain network computer allocated by the cloud server to the communication device, and the inside of the communication device also includes a media control application. The working principle and the working process of the media control application in the communication device are the same as those of the media control application in the first terminal, which are not repeated again herein.

Embodiment 3

The foregoing multiple embodiments describe a method for transmitting a media stream by using an initiator being a desktop cloud terminal as an example, and the following describes a method for transmitting a media stream by using a recipient being a desktop cloud terminal as an example.

Figure 5:
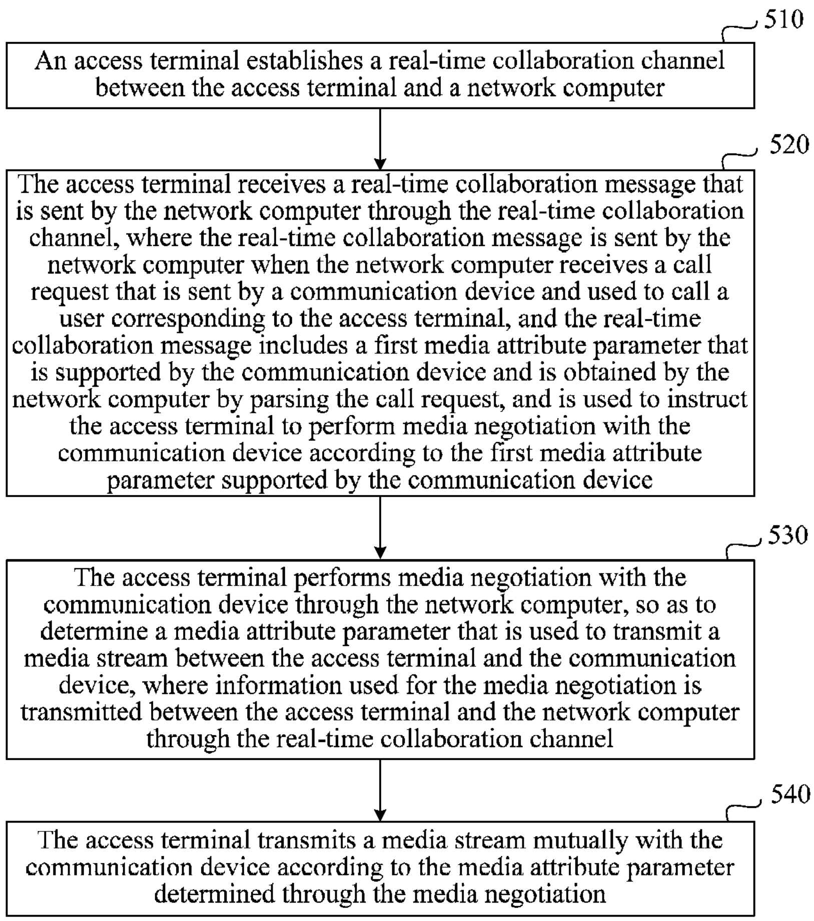
FIG. 5 is a flowchart of a method for transmitting a media stream according to Embodiment 3 of the present invention.

The following describes in detail a method for transmitting a media stream provided in Embodiment 3 of the present invention by using FIG. 5 as an example. FIG. 5 is a flowchart of a method for transmitting a media stream according to Embodiment 3 of the present invention. The embodiment of the present invention is implemented by an access terminal of the recipient. A first VDI channel is established between the access terminal and a network computer allocated by a cloud server to the access terminal. As shown in FIG. 5, the embodiment specifically includes the following steps:

Step 510: The access terminal establishes a real-time collaboration channel between the access terminal and the network computer.

Specifically, the access terminal establishes the real-time collaboration channel between the access terminal and the network computer NC (for example, NC1).

Before step 510 is executed, the access terminal establishes a first VDI channel between the access terminal and NC1, where the VDI channel transmits data input by a user application interface and by a user by using a device such as a keyboard and a mouse. That the access terminal establishes a first VDI channel between the access terminal and NC1 is the prior art, which is not repeated again herein.

Further, in the embodiment of the present invention, the establishing, by the access terminal, the real-time collaboration channel between the access terminal and NC1 specifically includes:

establishing, by the access terminal, a WebSocket channel between the access terminal and NC1 through a web socket WebSocket server; or, after establishing the first VDI channel between the access terminal and NC1 (the VDI channel is used to transmit data input by a user application interface and by a user by using a device such as a keyboard and a mouse), establishing, by the access terminal, a second VDI channel according to the ICA protocol; or, establishing, by the access terminal, a point-to-point data channel between a browser in the access terminal and a browser in NC1 by using a data channel mechanism in a browser web real-time communication WebRTC application of the access terminal.

Step 520: The access terminal receives a real-time collaboration message that is sent by the network computer through the real-time collaboration channel, where the real-time collaboration message is sent by the network computer when the network computer receives a call request that is sent by a communication device and used to call a user corresponding to the access terminal, and the real-time collaboration message includes a first media attribute parameter that is supported by the communication device and is obtained by the network computer by parsing the call request, and is used to instruct the access terminal to perform media negotiation with the communication device according to the first media attribute parameter supported by the communication device.

Specifically, the access terminal receives a real-time collaboration message that is sent by NC1 through the real-time collaboration channel established in step 510, where the real-time collaboration message is sent by NC1 when receiving a call request that is sent by the communication device and used to call a user corresponding to the access terminal, and the real-time collaboration message includes the first media attribute parameter that is supported by the communication device and is obtained by the network computer by parsing the call request.

It may be understood that, when performing communication interaction with NC1, the communication device needs to forward a communication message through a WebRTC server. When the communication device sends the first media attribute parameter to NC1 through the WebRTC server, the WebRTC server may add the first media attribute parameter into a connection request message for sending.

In the embodiment of the present invention, the first media attribute parameter specifically refers to information necessary for the communication device to establish a video and audio call and transmit a media stream, where the first media attribute parameter includes a media format supported by the communication device, and an IP address and a port number that are used to receive media.

The process for the communication device to obtain the first media attribute parameter supported by the communication device is the same as the process for the access terminal to obtain the first media attribute parameter supported by the access terminal described in Embodiment 1, which is not repeated again herein.

Step 530: The access terminal performs media negotiation with the communication device through the network computer, so as to determine a media attribute parameter that is used to transmit a media stream between the access terminal and the communication device, where information used for the media negotiation is transmitted between the access terminal and the network computer through the real-time collaboration channel Specifically, the access terminal performs media negotiation with the communication device through NC1, to determine a media attribute parameter that is used to transmit a media stream between the access terminal and the communication device. The access terminal transmits, through the real-time collaboration channel established in step 510, the information used for media negotiation.

Further, in this step, the performing, by the access terminal through the network computer, media negotiation with the communication device to determine a media attribute parameter that is used to transmit a media stream between the access terminal and the communication device specifically includes:

determining, by the access terminal according to the first media attribute parameter, a second media attribute parameter supported by the access terminal, where the second media attribute parameter includes an IP address and a port number of the access terminal that are used to receive media, and a media format that is supported by both the access terminal and the communication device and is determined by the access terminal according to the first media attribute parameter; and sending, by the access terminal, the second media attribute parameter to NC1 through the real-time collaboration channel, so as to enable NC1 to forward the second media attribute parameter to the communication device. The communication device completes media negotiation according to the received second media attribute parameter.

It may be understood that, when performing communication interaction with the communication device, NC1 needs to forward a communication message through a WebRTC server. When sending the second media attribute parameter to the communication device through the WebRTC server, NC1 may add the second media attribute parameter into a connect reply message for sending.

The determining, by the access terminal according to the first media attribute parameter, a second media attribute parameter supported by the access terminal specifically is: invoking, by the access terminal, a new peer connection interface function webkitRTCPeerConnection( ) in a browser application programming interface (Application Programming Interface, API for short) of the access terminal; and generating, by the access terminal, a peer connection interface peerConnection interface by using the webkitRTCPeerConnection( ) and obtaining, by using a create answer function creatAnswer( ) included in the peerConnection interface, the second media attribute parameter supported by the access terminal.

The obtaining, by the access terminal, a second media attribute parameter supported by the access terminal is implemented specifically through the following steps: obtaining, by the access terminal, a third media attribute parameter by using the creatAnswer( ) where the third media attribute parameter specifically includes all media attribute parameters supported by the access terminal; and selecting, by the access terminal from the third media attribute parameter according to the first media attribute parameter, one or more media attribute parameters same as the first media attribute parameter as the second media attribute parameters supported by the access terminal.

Step 540: The access terminal transmits a media stream mutually with the communication device according to the media attribute parameter determined through the media negotiation.

Specifically, the access terminal transmits a media stream mutually with the communication device according to the first and second media attribute parameters determined through the media negotiation.

Further, in this step, the transmitting, by the access terminal, a media stream mutually with the communication device according to the media attribute parameter determined through the media negotiation specifically includes:

sending, by the access terminal, first media to the communication device by using the IP address and the port number of the communication device that are used to receive media, and receiving second media that is sent by the communication device by using the IP address and the port number of the access terminal that are used to receive media, where both the first media and the second media are encoded by adopting the media format included in the second media attribute parameter.

In this step, when the communication device transmits media mutually with the access terminal, the communication device further sends a connection success message to the WebRTC server, and then the communication device transmits media mutually with the access terminal. Video and audio conversation may be performed between users.

Optionally, in the embodiment of the present invention, before the establishing, by the access terminal, a real-time collaboration channel between the access terminal and the network computer in step 510, the method further includes a step: The access terminal receives a HyperText Markup Language HTML webpage, obtains a media control application from the HTML webpage, and configures the media control application into the access terminal. Through the foregoing step, the access terminal may be provided with the media control application, and the access terminal completes the foregoing step 510 to step 540 by using the media control application. The specific step is as follows:

receiving, by the access terminal, a HyperText Markup Language HTML webpage that is sent by a web interface module in an application server by invoking a configuration file, where the HTML webpage includes the media control application; and obtaining, by the access terminal, the media control application through the HTML webpage, and configuring the media control application into the access terminal, so that the access terminal completes, by using the media control application, transmitting the real-time collaboration message and information used for the media negotiation to the network computer, further obtains the first media attribute parameter by using the media control application, further performs media negotiation with the communication device by using the media control application, and transmits a media stream mutually with the communication device according to the media attribute parameter determined through the media negotiation.

It may be understood that, in Embodiment 1, the process for an access terminal of an initiator to access a desktop cloud system, receive an HTML webpage, obtain a media control application, and configure the media control application locally is described in detail. In the embodiment of the present invention, the process for the access terminal of the recipient to access a desktop cloud system, receive an HTML webpage, obtain a media control application, and configure the media control application locally is the same as that for an access terminal of an initiator, which is not repeated again herein.

Optionally, in the embodiment of the present invention, the method further includes a step: If the access terminal determines that the access terminal does not support the first media attribute parameter, the access terminal sends a connection failure message to the communication device through a network computer. Through the step, the access terminal no longer transmits the media stream mutually with the communication device. The specific step is as follows:

invoking, by the access terminal, a set peer-end media parameter function (setRemoteDescription( ) ) in a browser application programming interface API of the access terminal according to the first media attribute parameter, and determining whether the access terminal supports the first media attribute parameter by using the setRemoteDescription( ). If the access terminal determines that the access terminal does not support the first media attribute parameter, the access terminal rejects transmitting the media stream mutually with the communication device, and sends the connection failure message to the communication device through NC1.

In the embodiment of the present invention, that the access terminal does not support the first media attribute parameter specifically refers to that the media attribute parameter supported by the access terminal does not match the first media attribute parameter, so that the access terminal does not support the first media attribute parameter.

In the embodiment of the present invention, the access terminal specifically is a terminal that can access a desktop cloud system, such as a PC/TC. The communication device differs in different current environments, and the communication device specifically is a desktop cloud terminal, a media access device, a conference server, or the like.

Therefore, by applying the method for transmitting a media stream provided in the embodiment of the present invention, an access terminal receives, through a real-time collaboration channel established to a network computer, a real-time collaboration message that is sent by the network computer, initiates, through the network computer, media negotiation with a communication device according to the real-time collaboration message, and transmits a media stream mutually with the communication device according to a media attribute parameter determined through the media negotiation. Because of the technical characteristics that the access terminal exchanges the media attribute parameter with the communication device through the network computer, to complete the media negotiation between the access terminal and the communication device, and the access terminal transmits the media stream to the communication device, the access terminal and the communication device can directly transmit the media stream to each other, and no longer perform transmission by using the NC, thereby avoiding the problems in the prior art that the delay of the media stream is obvious and communication quality is reduced because the NC needs to perform conversion and transmission on media data, and bandwidth occupancy between a TC/PC and the NC is increased and bandwidth is wasted because a media stream needs to be transferred back and forth between the TC/PC and the NC through a VDI channel Therefore, the delay of the media stream is reduced, and the bandwidth is saved.

Embodiment 4

Figure 6:
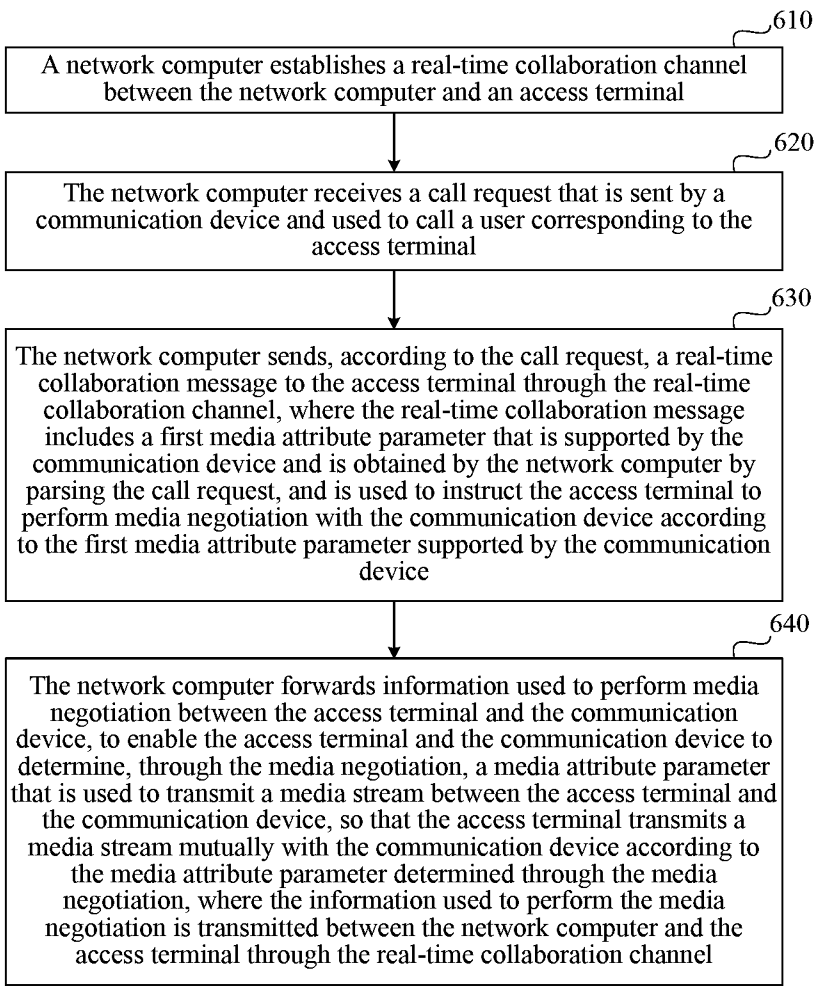
FIG. 6 is a flowchart of a method for transmitting a media stream according to Embodiment 4 of the present invention.

The following describes in detail a method for transmitting a media stream provided in Embodiment 4 of the present invention by using FIG. 6 as an example. FIG. 6 is a flowchart of a method for transmitting a media stream according to Embodiment 4 of the present invention. The embodiment of the present invention is implemented by a network computer in a cloud server. A first VDI channel is established between the network computer and an access terminal, and as shown in FIG. 6, the embodiment specifically includes the following steps:

Step 610: The network computer establishes a real-time collaboration channel between the network computer and the access terminal.

Specifically, the network computer NC (for example, NC1) establishes the real-time collaboration channel between the network computer and the access terminal.

Before step 610 is executed, NC1 establishes a first VDI channel between NC1 and the access terminal, where the VDI channel transmits data input by a user application interface and by a user by using a device such as a keyboard and a mouse. That NC1 establishes a first VDI channel between NC1 and the access terminal is the prior art, which is not repeated again herein.

Further, in the embodiment of the present invention, the establishing, by NC1, the real-time collaboration channel between NC1 and the access terminal specifically includes:

establishing, by NC1, a WebSocket channel between NC1 and the access terminal through a web socket WebSocket server; or, after establishing the first VDI channel between NC1 and the access terminal (the VDI channel is used to transmit data input by a user application interface and by a user by using a device such as a keyboard and a mouse), establishing, by NC1, a second VDI channel according to the ICA protocol; or, establishing, by NC1, a point-to-point data channel between a browser in NC1 and a browser in the access terminal by using a data channel mechanism in a browser web real-time communication WebRTC application of NC1.

Step 620: The network computer receives a call request that is sent by a communication device and used to call a user corresponding to the access terminal.

Specifically, the access terminal accesses a desktop cloud system, NC1 transmits a user application interface to the access terminal, the access terminal receives and displays the user application interface transmitted by NC1, and NC1 receives a call request that is sent by a communication device about to communicate with the access terminal and used to call a user corresponding to the access terminal.

Step 630: The network computer sends, according to the call request, a real-time collaboration message to the access terminal through the real-time collaboration channel, where the real-time collaboration message includes a first media attribute parameter that is supported by the communication device and is obtained by the network computer by parsing the call request, and is used to instruct the access terminal to perform media negotiation with the communication device according to the first media attribute parameter supported by the communication device.

Specifically, when NC1 receives the call request that is sent by the communication device about to communicate with the access terminal and used to call a user corresponding to the access terminal, NC1 parses the call request, and determines that the communication device expects to establish a video and audio call to the user corresponding to the access terminal. NC1 sends a real-time collaboration message to the access terminal through the real-time collaboration channel established in step 610, where the real-time collaboration message includes a first media attribute parameter obtained by NC1 by parsing the call request and supported by the communication device, so that the access terminal performs media negotiation with the communication device according to the first media attribute parameter.

In the embodiment of the present invention, the first media attribute parameter specifically refers to information necessary for the communication device to establish a video and audio call and transmit a media stream, where the first media attribute parameter includes a media format supported by the communication device, and an IP address and a port number that are used to receive media.

It may be understood that, when performing communication interaction with NC1, the communication device needs to forward a communication message through a WebRTC server. When the communication device sends the first media attribute parameter to NC1 through the WebRTC server, the WebRTC server may add the first media attribute parameter into a connection request message for sending.

Step 640: The network computer forwards information used to perform media negotiation between the access terminal and the communication device, to enable the access terminal and the communication device to determine, through the media negotiation, a media attribute parameter that is used to transmit a media stream between the access terminal and the communication device, so that the access terminal transmits a media stream mutually with the communication device according to the media attribute parameter determined through the media negotiation, where the information used to perform the media negotiation is transmitted between the network computer and the access terminal through the real-time collaboration channel.

Specifically, the access terminal initiates the media negotiation to the communication device according to the received real-time collaboration message. NC1 forwards information used to perform media negotiation between the access terminal and the communication device, to enable the access terminal and the communication device to determine, through the media negotiation, a media attribute parameter that is used to transmit a media stream between the access terminal and the communication device, so that the access terminal transmits the media stream mutually with the communication device according to the media attribute parameter determined through the media negotiation, where the information used to perform media negotiation is transmitted between NC1 and the access terminal through the real-time collaboration channel established in step 610.

Further, in this step, the forwarding, by the network computer, information used to perform media negotiation between the access terminal and the communication device, to enable the access terminal and the communication device to determine, through the media negotiation, a media attribute parameter that is used to transmit a media stream between the access terminal and the communication device specifically includes:

receiving, by NC1, a second media attribute parameter that is sent by the access terminal through the real-time collaboration channel, where the second media attribute parameter includes an IP address and a port number of the access terminal that are used to receive media, and a media format that is supported by both the access terminal and the communication device and is determined by the access terminal according to the first media attribute parameter; and forwarding, by NC1, the second media attribute parameter to the communication device, so that the communication device sends first media to the access terminal by using the IP address and the port number of the access terminal that are used to receive media, and receives second media that is sent by the access terminal by using the IP address and the port number of the communication device that are used to receive media, where both the first media and the second media are encoded by adopting the media format included in the second media attribute parameter.

It may be understood that, when performing communication interaction with the communication device, NC1 needs to forward a communication message through a WebRTC server. When sending the second media attribute parameter to the communication device through the WebRTC server, NC1 may add the second media attribute parameter into a connect reply message for sending.

Optionally, in the embodiment of the present invention, before step 610 of establishing, by the network computer, a real-time collaboration channel between the network computer and the access terminal, the method further includes a step: An access terminal of a recipient accesses a desktop cloud system. Because the process for an access terminal of a recipient to access a desktop cloud system is the same as the process for an access terminal of an initiator to access a desktop cloud system, and in Embodiment 1, and the process for an access terminal of an initiator to access a desktop cloud system is described in detail, the process for an access terminal of a recipient to access a desktop cloud system is not repeated again herein.

Optionally, in the embodiment of the present invention, before the forwarding, by the network computer, the second media attribute parameter to the communication device, the method further includes a step: The network computer performs encapsulation processing on the second media attribute parameter to generate a call response. The specific step is as follows:

invoking, by NC1, a WebRTC signaling message protocol stack; and performing, by NC1, encapsulation processing on the second media attribute parameter by using the signaling message protocol stack, to generate a call response, where the call response includes the second media attribute parameter.

It may be understood that, only after performing encapsulation processing on the second media attribute parameter, NC1 may forward the encapsulated second media attribute parameter to the communication device through the WebRTC server. In the embodiment of the present invention, a message header (for example: from XX to XX) may be added to the second media attribute parameter. The added message header may enable the WebRTC server to determine a transmission path of the call response, so that the WebRTC server forwards the call response to the communication device.

Optionally, in the embodiment of the present invention, the method further includes a step: If the access terminal determines that the access terminal does not support the first media attribute parameter, NC1 receives a connection failure message sent by the access terminal, and forwards the connection failure message to the communication device. Through the step, the access terminal establishes no media transmission channel between the access terminal and the communication device. The specific step is as follows:

when the access terminal determines, according to the first media attribute parameter, that the access terminal does not support the first media attribute parameter, rejecting, by the access terminal, transmitting a media stream mutually with the communication device, generating, by the access terminal, a connection failure message, and sending the connection failure message to NC1, so that NC1 sends the received connection failure message to a communication device.

In the embodiment of the present invention, that the access terminal does not support the first media attribute parameter specifically refers to that the media attribute parameter supported by the access terminal does not match the first media attribute parameter, so that the access terminal does not support the first media attribute parameter.

Therefore, by applying the method for transmitting a media stream provided in the embodiment of the present invention, an access terminal receives, through a real-time collaboration channel established to a network computer, a real-time collaboration message that is sent by the network computer, initiates, through the network computer, media negotiation with a communication device according to the real-time collaboration message, and transmits a media stream mutually with the communication device according to a media attribute parameter determined through the media negotiation. Because of the technical characteristics that the access terminal exchanges the media attribute parameter with the communication device through the network computer, to complete the media negotiation between the access terminal and the communication device, and the access terminal transmits the media stream to the communication device, the access terminal and the communication device can directly transmit the media stream to each other, and no longer perform transmission by using the NC, thereby avoiding the problems in the prior art that the delay of the media stream is obvious and communication quality is reduced because the NC needs to perform conversion and transmission on media data, and bandwidth occupancy between a TC/PC and the NC is increased and bandwidth is wasted because a media stream needs to be transferred back and forth between the TC/PC and the NC through a VDI channel Therefore, the delay of the media stream is reduced, and the bandwidth is saved.

To facilitate understanding of Embodiment 3 of the present invention and Embodiment 4 of the present invention, the following further describes specific embodiments with reference to accompanying drawings. The embodiments do not constitute any limitation to the embodiments of the present invention.

Figure 7:
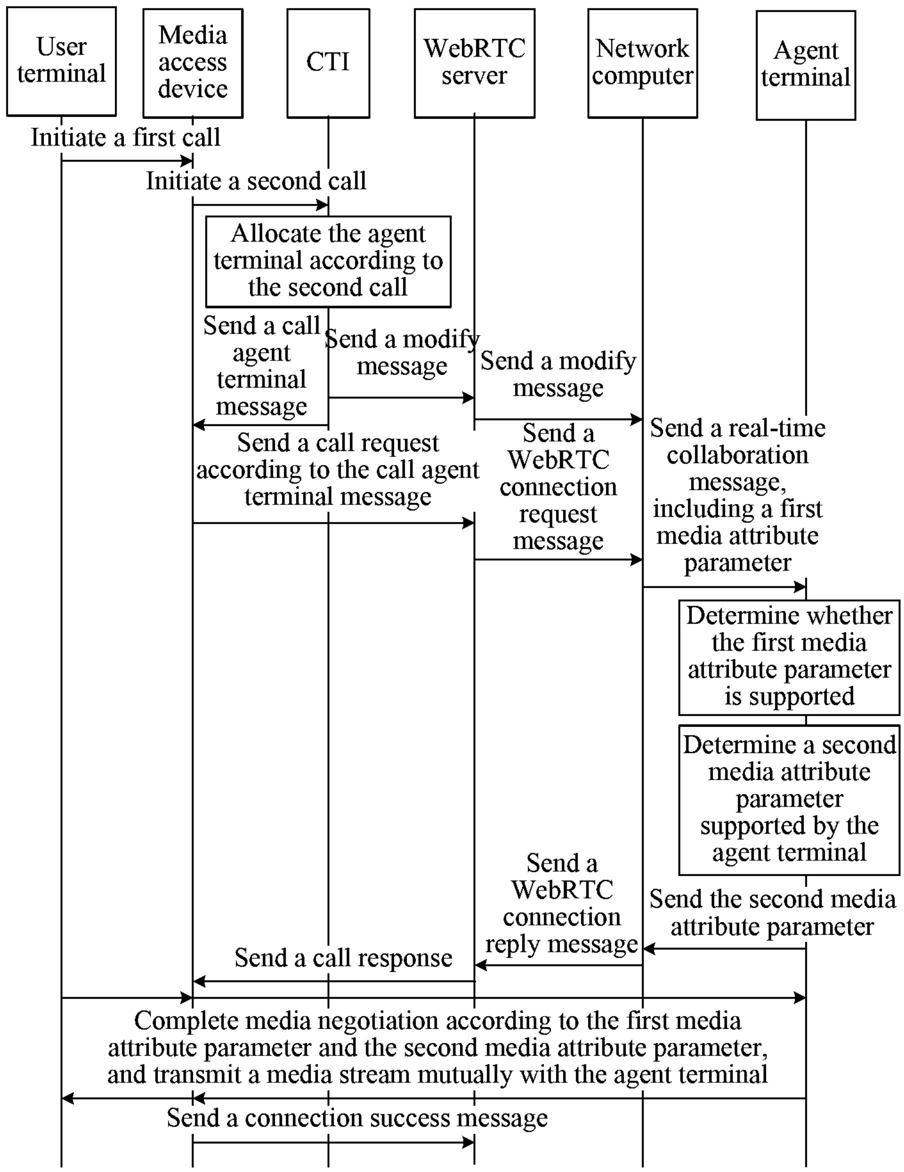
FIG. 7 is a signaling diagram of still another method for transmitting a media stream according to an embodiment of the present invention.

FIG. 7 is a signaling diagram of still another method for transmitting a media stream according to an embodiment of the present invention. The signaling diagram shown in FIG. 7 is a processing process for an access terminal to transmit a media stream to a communication device. As shown in FIG. 7, the access terminal is specifically an agent terminal in a CTI platform, and the communication device is specifically a media access device that can communicate with a user terminal. The following describes a method for transmitting a media stream by using examples.

A user initiates a first call to a user corresponding to an agent terminal by using a user terminal, where the first call is received by a media access device. The media access device initiates a second call to the CTI according to the first call initiated by the user, the CTI allocates the agent terminal to the user according to the second call, and the CTI sends, through a WebRTC server, a modify message to NC1 in corresponding communication with the agent terminal, so that NC1 determines that a state of the agent terminal in corresponding communication with NC1 is modified. Meanwhile, the CTI further sends a call agent terminal message to the media access device, and the media access device sends, through the WebRTC server, a call request of a user corresponding to a user call agent terminal to NC1 according to the call agent terminal message. When the call request is forwarded through the WebRTC server, the WebRTC server encapsulates the call request into a WebRTC connection request message.

According to the call request, NC1 sends a real-time collaboration message to the agent terminal in corresponding communication with NC1, where the real-time collaboration message includes a first media attribute parameter obtained by NC1 by parsing the call request and supported by the media access device. If the agent terminal determines that the agent terminal supports the first media attribute parameter, the agent terminal determines, according to the first media attribute parameter, a second media attribute parameter supported by the agent terminal.

The agent terminal sends the second media attribute parameter to NC1 through the real-time collaboration channel, and NC1 receives the second media attribute parameter sent by the agent terminal; and sends a call response to the media access device through the WebRTC server. When the call response is forwarded through the WebRTC server, the WebRTC server encapsulates the call response into a WebRTC connect reply message.

The agent terminal completes the media negotiation according to the first media attribute parameter and the second media attribute parameter, and transmits a media stream mutually with the media access device.

Embodiment 5

Figure 8:
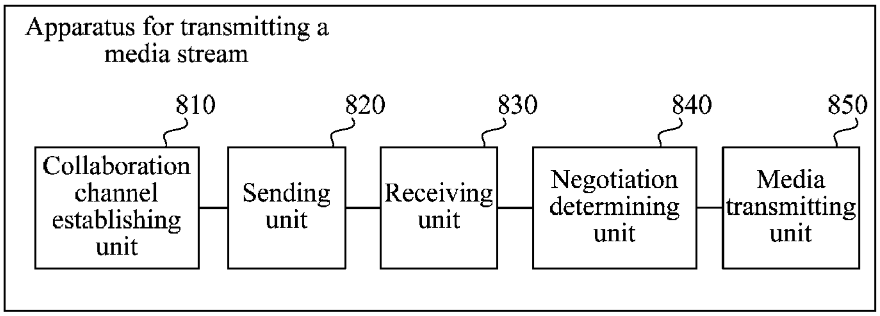
FIG. 8 is a structural diagram of an apparatus for transmitting a media stream according to Embodiment 5 of the present invention.

The methods described in the foregoing multiple embodiments may all implement a method for transmitting a media stream. Correspondingly, Embodiment 5 of the present invention further provides an apparatus for transmitting a media stream, so as to implement the method for transmitting a media stream in Embodiment 1. As shown in FIG. 8, a first virtualized desktop infrastructure VDI channel is established between the apparatus and a network computer allocated by a cloud server to the apparatus. The apparatus includes: a collaboration channel establishing unit 810, a sending unit 820, a receiving unit 830, a negotiation determining unit 840 and a media transmitting unit 850.

The collaboration channel establishing unit 810 in the apparatus is configured to establish a real-time collaboration channel between the apparatus and the network computer.

The sending unit 820 is configured to send, to the network computer through the first VDI channel, an operation instruction input by a user.

The receiving unit 830 is configured to receive a real-time collaboration message that is sent by the network computer through the real-time collaboration channel established by the collaboration channel establishing unit, where the real-time collaboration message is sent when the network computer determines that the operation instruction is an operation instruction used to initiate a call, and is used to instruct the apparatus to initiate media negotiation with the communication device.

The negotiation determining unit 840 is configured to perform media negotiation with the communication device through the network computer, so as to determine a media attribute parameter that is used to transmit a media stream between the apparatus and the communication device, and configured to transmit the media attribute parameter determined through the media negotiation to the media transmitting unit, where the real-time collaboration channel established between the apparatus and the network computer by the collaboration channel establishing unit transmits information used for the media negotiation.

The media transmitting unit 850 is configured to receive the media attribute parameter determined through the media negotiation from the negotiation determining unit, and transmit a media stream mutually with the communication device according to the media attribute parameter determined through the media negotiation.

The collaboration channel establishing unit 810 is specifically configured to establish a WebSocket channel between the apparatus and the network computer through a web socket WebSocket server; or, establish a second virtualized desktop infrastructure VDI channel between the apparatus and the network computer; or, establish a point-to-point data channel between a browser in the apparatus and a browser in the network computer by using a data channel mechanism in a browser web real-time communication WebRTC application of the apparatus.

Figure 9:
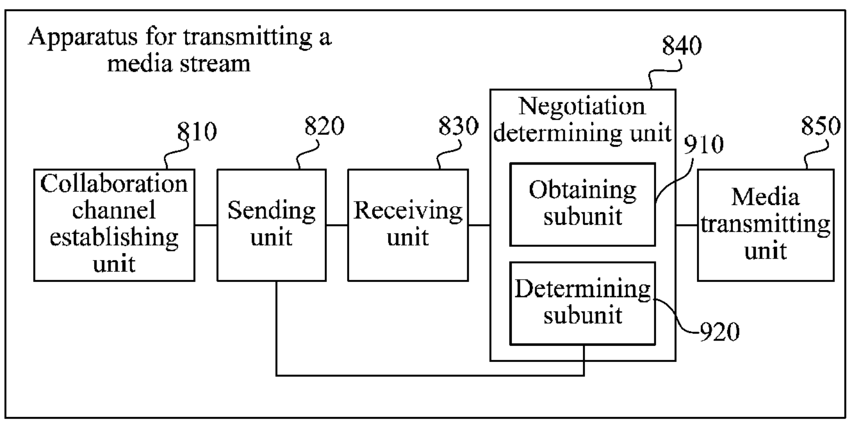
FIG. 9 is a structural diagram of another apparatus for transmitting a media stream according to Embodiment 5 of the present invention.

Further, as shown in FIG. 9, the negotiation determining unit 840 further includes:

58 an obtaining subunit 910 and a determining subunit 920.

The obtaining subunit 910 is configured to obtain a first media attribute parameter supported by the apparatus, and configured to transmit the first media attribute parameter to the sending unit, where the first media attribute parameter includes a media format supported by the apparatus, and an IP address and a port number that are used to receive media.

The sending unit 820 is further configured to receive the first media attribute parameter from the obtaining subunit, and send the first media attribute parameter to the network computer through the real-time collaboration channel established by the collaboration channel establishing unit, so as to enable the network computer to send a connection request message carrying the first media attribute parameter to the communication device to be called.

The receiving unit 830 is further configured to receive a second media attribute parameter that is received by the network computer from the communication device and is sent by the network computer through the real-time collaboration channel established by the collaboration channel establishing unit, and transmit the second media attribute parameter to the determining subunit of the negotiation determining unit, where the second media attribute parameter includes an IP address and a port number of the communication device that are used to receive media, and a media format that is supported by both the apparatus and the communication device and is determined by the communication device according to the first media attribute parameter.

The determining subunit 920 is configured to receive the second media attribute parameter from the receiving unit, and configured to transmit the second media attribute parameter to the media transmitting unit.

The media transmitting unit 850 is specifically configured to send first media to the communication device by using the IP address and the port number of the communication device that are used to receive media, and receive second media that is sent by the communication device by using the IP address and the port number of the apparatus that are used to receive media, where both the first media and the second media are encoded by adopting the media format included in the second media attribute parameter.

The obtaining subunit 910 is specifically configured to invoke a new peer connection interface function in a browser application programming interface API of the apparatus; and generate a peer connection interface by using the new peer connection interface function, and obtain, by using a create offer function included in the peer connection interface, the first media attribute parameter supported by the apparatus.

Therefore, by applying the apparatus for transmitting a media stream provided in the embodiment of the present invention, the apparatus receives, through a real-time collaboration channel established to a network computer, a real-time collaboration message that is sent by the network computer, initiates, through the network computer, media negotiation with a communication device according to the real-time collaboration message, and transmits a media stream mutually with the communication device according to a media attribute parameter determined through the media negotiation. Because of the technical characteristics that the apparatus exchanges the media attribute parameter with the communication device through the network computer, to complete the media negotiation between the apparatus and the communication device, and the apparatus transmits the media stream to the communication device, so that the apparatus and the communication device can directly transmit the media stream to each other, and no longer perform transmission by using the NC, thereby avoiding the problems in the prior art that the delay of the media stream is obvious and communication quality is reduced because the NC needs to perform conversion and transmission on media data, and bandwidth occupancy between a TC/PC and the NC is increased and bandwidth is wasted because a media stream needs to be transferred back and forth between the TC/PC and the NC through a VDI channel Therefore, the delay of the media stream is reduced, and the bandwidth is saved.

Embodiment 6

Figure 10:
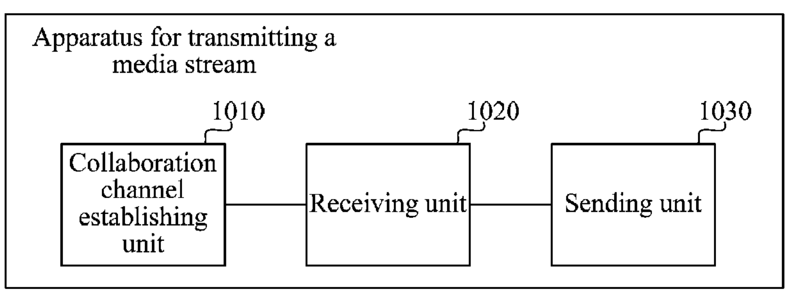
FIG. 10 is a structural diagram of an apparatus for transmitting a media stream according to Embodiment 6 of the present invention.

The methods described in the foregoing multiple embodiments may all implement a method for transmitting a media stream. Correspondingly, Embodiment 6 of the present invention further provides an apparatus for transmitting a media stream, so as to implement the method for transmitting a media stream in Embodiment 2. As shown in FIG. 10, a first virtualized desktop infrastructure VDI channel is established between the apparatus and the access terminal. The apparatus includes: a collaboration channel establishing unit 1010, a receiving unit 1020 and a sending unit 1030. The apparatus is allocated by a cloud server to the access terminal.

The collaboration channel establishing unit 1010 in the apparatus is configured to establish a real-time collaboration channel between the apparatus and the access terminal.

The receiving unit 1020 is configured to receive an operation instruction that is input by a user and is sent by the access terminal through the first VDI channel The sending unit 1030 is configured to: when it is determined that the operation instruction is an operation instruction used to instruct that a call be initiated, send a real-time collaboration message to the access terminal through the real-time collaboration channel established by the collaboration channel establishing unit, where the real-time collaboration message is used to instruct the access terminal to initiate media negotiation with the communication device.

The sending unit 1030 is further configured to forward information used to perform media negotiation between the access terminal and the communication device, to enable the access terminal and the communication device to determine, through the media negotiation, a media attribute parameter that is used to transmit a media stream between the access terminal and the communication device, so that the access terminal transmits a media stream mutually with the communication device according to the media attribute parameter determined through the media negotiation, where the information used to perform the media negotiation is transmitted between the apparatus and the access terminal through the real-time collaboration channel established by the collaboration channel establishing unit.

The collaboration channel establishing unit 1010 is specifically configured to establish a WebSocket channel between the apparatus and the access terminal through a web socket WebSocket server; or, establish a second VDI channel between the apparatus and the access terminal; or, establish a point-to-point data channel between a browser in the apparatus and a browser in the access terminal by using a data channel mechanism in a browser web real-time communication WebRTC application of the apparatus.

The receiving unit 1020 is specifically configured to receive a first media attribute parameter that is supported by the access terminal and is sent by the access terminal through the real-time collaboration channel established by the collaboration channel establishing unit, and configured to transmit the first media attribute parameter to the sending unit, where the first media attribute parameter includes a media format supported by the access terminal, and an IP address and a port number that are used to receive media.

The sending unit 1030 is specifically configured to receive the first media attribute parameter from the receiving unit, and send a connection request message to the communication device according to the operation instruction that is input by the user and used to instruct that a call be initiated, where the connection request message includes the first media attribute parameter.

The receiving unit 1020 is further specifically configured to receive a connect reply message that is sent by the communication device when the communication device determines that the communication device supports the first media attribute parameter, where the connect reply message includes a second media attribute parameter supported by the communication device, and configured to transmit the second media attribute parameter to the sending unit, where the second media attribute parameter includes an IP address and a port number of the communication device that are used to receive media, and a media format that is supported by both the access terminal and the communication device and is determined by the communication device according to the first media attribute parameter.

The sending unit 1030 is further specifically configured to receive the second media attribute parameter from the receiving unit, and send the second media attribute parameter to the access terminal through the real-time collaboration channel established by the collaboration channel establishing unit, so that the access terminal sends first media to the communication device by using the IP address and the port number of the communication device that are used to receive media, and receives second media that is sent by the communication device by using the IP address and the port number of the access terminal that are used to receive media, where both the first media and the second media are encoded by adopting the media format included in the second media attribute parameter.

Figure 11:
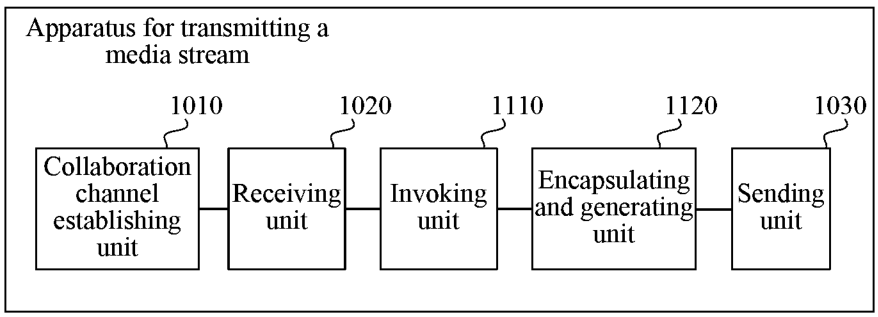
FIG. 11 is a structural diagram of another apparatus for transmitting a media stream according to Embodiment 6 of the present invention.

Further, as shown in FIG. 11, the apparatus further includes: an invoking unit 1110, configured to invoke a WebRTC signaling message protocol stack; and an encapsulating and generating unit 1120, configured to perform encapsulation processing on the first media attribute parameter by using the signaling message protocol stack invoked by the invoking unit, to generate the connection request message, where the connection request message includes the first media attribute parameter.

Therefore, by applying the apparatus for transmitting a media stream provided in the embodiment of the present invention, an access terminal receives, through a real-time collaboration channel established to the apparatus, a real-time collaboration message that is sent by the apparatus, initiates, by using the apparatus, media negotiation with a communication device according to the real-time collaboration message, and transmits a media stream mutually with the communication device according to a media attribute parameter determined through the media negotiation. Because of the technical characteristics that the access terminal exchanges the media attribute parameter with the communication device through the apparatus, to complete the media negotiation between the access terminal and the communication device, and the access terminal transmits the media stream to the communication device, the access terminal and the communication device can directly transmit the media stream to each other, and no longer perform transmission by using the NC, thereby avoiding the problems in the prior art that the delay of the media stream is obvious and communication quality is reduced because the NC needs to perform conversion and transmission on media data, and bandwidth occupancy between a TC/PC and the NC is increased and bandwidth is wasted because a media stream needs to be transferred back and forth between the TC/PC and the NC through a VDI channel Therefore, the delay of the media stream is reduced, and the bandwidth is saved.

Embodiment 7

Figure 12:
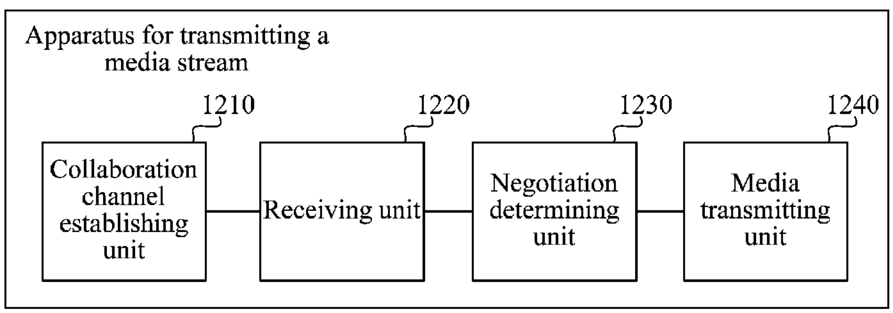
FIG. 12 is a structural diagram of an apparatus for transmitting a media stream according to Embodiment 7 of the present invention.

The methods described in the foregoing multiple embodiments may all implement a method for transmitting a media stream. Correspondingly, Embodiment 7 of the present invention further provides an apparatus for transmitting a media stream, so as to implement the method for transmitting a media stream in Embodiment 3. As shown in FIG. 12, a first virtualized desktop infrastructure VDI channel is established between the apparatus and a network computer allocated by a cloud server to the apparatus. The apparatus includes: a collaboration channel establishing unit 1210, a receiving unit 1220, a negotiation determining unit 1230 and a media transmitting unit 1240.

The collaboration channel establishing unit 1210 in the apparatus is configured to establish a real-time collaboration channel between the apparatus and the network computer.

The receiving unit 1220 is configured to receive a real-time collaboration message that is sent by the network computer through the real-time collaboration channel established by the collaboration channel establishing unit, where the real-time collaboration message is sent by the network computer when the network computer receives a call request that is sent by a communication device and used to call a user corresponding to the apparatus, and the real-time collaboration message includes a first media attribute parameter that is supported by the communication device and is obtained by the network computer by parsing the call request, and is used to instruct the apparatus to perform media negotiation with the communication device according to the first media attribute parameter supported by the communication device.

The negotiation determining unit 1230 is configured to perform media negotiation with the communication device through the network computer, so as to determine a media attribute parameter that is used to transmit a media stream between the apparatus and the communication device, and configured to transmit the media attribute parameter determined through the media negotiation to the media transmitting unit, where the real-time collaboration channel established between the apparatus and the network computer by the collaboration channel establishing unit transmits information used for the media negotiation.

The media transmitting unit 1240 is configured to receive the media attribute parameter determined through the media negotiation from the negotiation determining unit, and transmit a media stream mutually with the communication device according to the media attribute parameter determined through the media negotiation.

The collaboration channel establishing unit 1210 is specifically configured to establish a WebSocket channel between the apparatus and the network computer through a web socket WebSocket server; or, establish a second VDI channel between the apparatus and the network computer; or, establish a point-to-point data channel between a browser in the apparatus and a browser in the network computer by using a data channel mechanism in a browser web real-time communication WebRTC application of the apparatus.

The first media attribute parameter included in the real-time collaboration message received by the receiving unit 1220 includes a media format supported by the communication device, and an IP address and a port number that are used to receive media.

Figure 13:
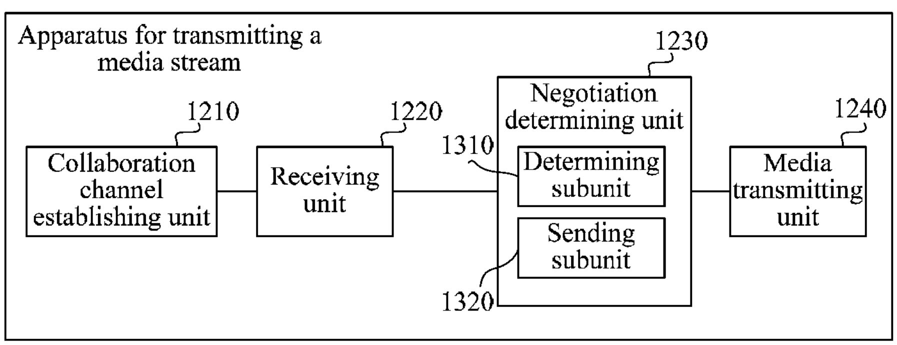
FIG. 13 is a structural diagram of another apparatus for transmitting a media stream according to Embodiment 7 of the present invention.

Further, as shown in FIG. 13, the negotiation determining unit 1230 further includes: a determining subunit 1310 and a sending subunit 1320.

The determining subunit 1310 is configured to determine, according to the first media attribute parameter, a second media attribute parameter supported by the apparatus, and configured to transmit the second media attribute parameter to the sending subunit, where the second media attribute parameter includes an IP address and a port number of the apparatus that are used to receive media, and a media format that is supported by both the apparatus and the communication device and is determined by the apparatus according to the first media attribute parameter.

The sending subunit 1320 is configured to receive the second media attribute parameter from the determining subunit, and transmit the second media attribute parameter to the media transmitting unit, and configured to send the second media attribute parameter to the network computer through the real-time collaboration channel established by the collaboration channel establishing unit, so as to enable the network computer to forward the second media attribute parameter to the communication device.

The media transmitting unit is specifically configured to send first media to the communication device by using the IP address and the port number of the communication device that are used to receive media, and receive second media that is sent by the communication device by using the IP address and the port number of the apparatus that are used to receive media, where both the first media and the second media are encoded by adopting the media format included in the second media attribute parameter.

The determining subunit 1310 is specifically configured to invoke a new peer connection interface function in a browser application programming interface API of the apparatus, generate a peer connection interface by using the new peer connection interface function, and obtain the second media attribute parameter by using a create answer function included in the peer connection interface.

Therefore, by applying the apparatus for transmitting a media stream provided in the embodiment of the present invention, the apparatus receives, through a real-time collaboration channel established to a network computer, a real-time collaboration message that is sent by the network computer, initiates, through the network computer, media negotiation with a communication device according to the real-time collaboration message, and transmits a media stream mutually with the communication device according to a media attribute parameter determined through the media negotiation. Because of the technical characteristics that the apparatus exchanges the media attribute parameter with the communication device through the network computer, to complete the media negotiation between the apparatus and the communication device, and the apparatus transmits the media stream to the communication device, so that the apparatus and the communication device can directly transmit the media stream to each other, and no longer perform transmission by using the NC, thereby avoiding the problems in the prior art that the delay of the media stream is obvious and communication quality is reduced because the NC needs to perform conversion and transmission on media data, and bandwidth occupancy between a TC/PC and the NC is increased and bandwidth is wasted because a media stream needs to be transferred back and forth between the TC/PC and the NC through a VDI channel Therefore, the delay of the media stream is reduced, and the bandwidth is saved.

Embodiment 8

Figure 14:
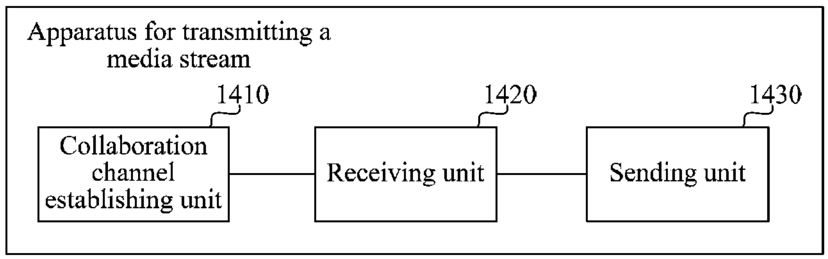
FIG. 14 is a structural diagram of an apparatus for transmitting a media stream according to Embodiment 8 of the present invention.

The methods described in the foregoing multiple embodiments may all implement a method for transmitting a media stream. Correspondingly, Embodiment 8 of the present invention further provides an apparatus for transmitting a media stream, so as to implement the method for transmitting a media stream in Embodiment 4. As shown in FIG. 14, a first virtualized desktop infrastructure VDI channel is established between the apparatus and the access terminal. The apparatus includes: a collaboration channel establishing unit 1410, a receiving unit 1420 and a sending unit 1430. The apparatus is allocated by a cloud server to the access terminal.

The collaboration channel establishing unit 1410 in the apparatus is configured to establish a real-time collaboration channel between the apparatus and the access terminal.

The receiving unit 1420 is configured to receive a call request that is sent by a communication device and used to call a user corresponding to the access terminal, and configured to transmit the call request to the sending unit.

The sending unit 1430 is configured to receive the call request from the receiving unit, and send, according to the call request, a real-time collaboration message to the access terminal through the real-time collaboration channel established by the collaboration channel establishing unit, where the real-time collaboration message includes a first media attribute parameter that is supported by the communication device and is obtained by the apparatus by parsing the call request, and is used to instruct the access terminal to perform media negotiation with the communication device according to the first media attribute parameter supported by the communication device.

The sending unit 1430 is further configured to forward information used to perform media negotiation between the access terminal and the communication device, to enable the access terminal and the communication device to determine, through the media negotiation, a media attribute parameter that is used to transmit a media stream between the access terminal and the communication device, so that the access terminal transmits a media stream mutually with the communication device according to the media attribute parameter determined through the media negotiation, where the information used to perform the media negotiation is transmitted between the apparatus and the access terminal through the real-time collaboration channel established by the collaboration channel establishing unit.

The collaboration channel establishing unit 1410 is specifically configured to establish a WebSocket channel between the apparatus and the access terminal through a web socket WebSocket server; or, establish a second VDI channel between the apparatus and the access terminal; or, establish a point-to-point data channel between a browser in the apparatus and a browser in the access terminal by using a data channel mechanism in a browser web real-time communication WebRTC application of the apparatus.

The first media attribute parameter included in the real-time collaboration message sent by the sending unit 1430 includes a media format supported by the communication device, and an IP address and a port number that are used to receive media.

The receiving unit 1420 is further configured to receive a second media attribute parameter that is sent by the access terminal through the real-time collaboration channel established by the collaboration channel establishing unit, and configured to transmit the second media attribute parameter to the sending unit, where the second media attribute parameter includes an IP address and a port number of the access terminal that are used to receive media and a media format that is supported by both the access terminal and the communication device and is determined by the access terminal according to the first media attribute parameter.

The sending unit 1430 is specifically configured to forward the second media attribute parameter received by the receiving unit to the communication device, so that the communication device sends first media to the access terminal by using the IP address and the port number of the access terminal that are used to receive media, and receives second media that is sent by the access terminal by using the IP address and the port number of the communication device that are used to receive media, where both the first media and the second media are encoded by adopting the media format included in the second media attribute parameter.

Figure 15:
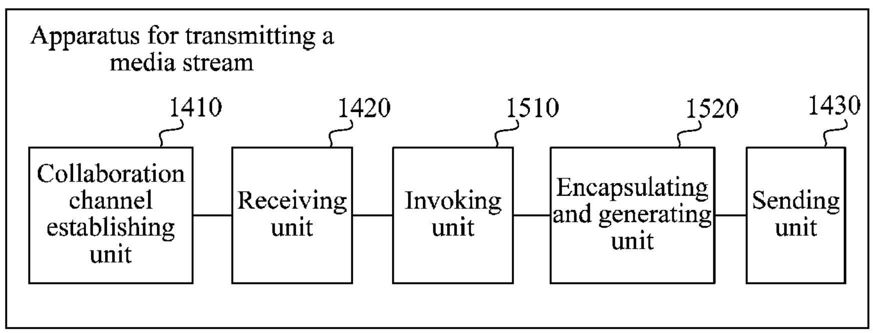
FIG. 15 is a structural diagram of another apparatus for transmitting a media stream according to Embodiment 8 of the present invention.

Further, as shown in FIG. 15, the apparatus further includes: an invoking unit 1510, configured to invoke a WebRTC signaling message protocol stack.

The encapsulating and generating unit 1520 is configured to perform, by using the signaling message protocol stack invoked by the invoking unit, encapsulation processing on the second media attribute parameter received by the receiving unit, to generate a call response, and configured to transmit the call response to the sending unit.

The sending unit 1430 is specifically configured to send the call response generated by the encapsulating and generating unit to the communication device, where the call response includes the second media attribute parameter.

Therefore, by applying the apparatus for transmitting a media stream provided in the embodiment of the present invention, an access terminal receives, through a real-time collaboration channel established to the apparatus, a real-time collaboration message that is sent by the apparatus, initiates, by using the apparatus, media negotiation with a communication device according to the real-time collaboration message, and transmits a media stream mutually with the communication device according to a media attribute parameter determined through the media negotiation. Because of the technical characteristics that the access terminal exchanges the media attribute parameter with the communication device through the apparatus, to complete the media negotiation between the access terminal and the communication device, and the access terminal transmits the media stream to the communication device, the access terminal and the communication device can directly transmit the media stream to each other, and no longer perform transmission by using the NC, thereby avoiding the problems in the prior art that the delay of the media stream is obvious and communication quality is reduced because the NC needs to perform conversion and transmission on media data, and bandwidth occupancy between a TC/PC and the NC is increased and bandwidth is wasted because a media stream needs to be transferred back and forth between the TC/PC and the NC through a VDI channel Therefore, the delay of the media stream is reduced, and the bandwidth is saved.

Embodiment 9

Figure 16:
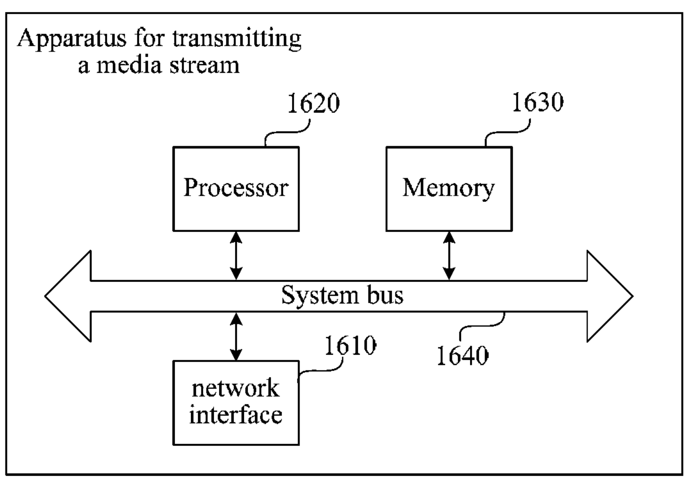
FIG. 16 is a hardware structural diagram of an apparatus for transmitting a media stream according to Embodiment 9 of the present invention.

In addition, the apparatus for transmitting a media stream provided in Embodiment 5 of the present invention may further adopt the following implementation manner, so as to implement the method for transmitting a media stream in the foregoing embodiment of the present invention. As shown in FIG. 16, a first virtualized desktop infrastructure VDI channel is established between the apparatus and a network computer allocated by a cloud server to the apparatus, and the apparatus for transmitting a media stream includes: a network interface 1610, a processor 1620 and a memory 1630. A system bus 1640 is configured to connect the network interface 1610, the processor 1620 and the memory 1630.

The network interface 1610 is configured to perform interaction communication with the network computer.

The memory 1630 may be a permanent memory, for example, a hard disk drive and a flash memory, and the memory 1630 is configured to store an application program, where the application program includes an instruction that can be used to enable the processor 1620 to access and execute the following:

establishing a real-time collaboration channel between the apparatus and the network computer;

sending, to the network computer through the first VDI channel, an operation instruction input by a user;

receiving a real-time collaboration message that is sent by the network computer through the real-time collaboration channel, where the real-time collaboration message is sent when the network computer determines that the operation instruction is an operation instruction used to instruct that a call be initiated, and is used to instruct the apparatus to initiate media negotiation with the communication device;

performing media negotiation with the communication device through the network computer, so as to determine a media attribute parameter that is used to transmit a media stream between the apparatus and the communication device, where information used for the media negotiation is transmitted between the apparatus and the network computer through the real-time collaboration channel; and transmitting a media stream mutually with the communication device according to the media attribute parameter determined through the media negotiation.

Further, in the application program stored by the memory 1630, an instruction that can be used to enable the processor 1620 to execute a process of establishing a real-time collaboration channel between the apparatus and the network computer is specifically an instruction of executing the following process:

establishing a WebSocket channel between the apparatus and the network computer through a web socket WebSocket server; or, establishing a second VDI channel between the apparatus and the network computer; or, establishing a point-to-point data channel between a browser in the apparatus and a browser in the network computer by using a data channel mechanism in a browser web real-time communication WebRTC application of the apparatus.

Further, in the application program stored by the memory 1630, an instruction that can be used to enable the processor 1620 to execute a process of performing media negotiation with the communication device through the network computer, so as to determine a media attribute parameter that is used to transmit a media stream between the apparatus and the communication device is specifically an instruction of executing the following processes:

obtaining a first media attribute parameter supported by the apparatus, where the first media attribute parameter includes a media format supported by the apparatus, and an IP address and a port number that are used to receive media;

sending the first media attribute parameter to the network computer through the real-time collaboration channel, so as to enable the network computer to send a connection request message carrying the first media attribute parameter to the communication device to be called; and receiving, a second media attribute parameter that is received by the network computer from the communication device and is sent by the network computer through the real-time collaboration channel, where the second media attribute parameter includes an IP address and a port number of the communication device that are used to receive media, and a media format that is supported by both the apparatus and the communication device and is determined by the communication device according to the first media attribute parameter.

Further, in the application program stored by the memory 1630, an instruction that can be used to enable the processor 1620 to execute a process of transmitting a media stream mutually with the communication device according to the media attribute parameter determined through the media negotiation is specifically an instruction of executing the following process:

sending first media to the communication device by using the IP address and the port number of the communication device that are used to receive media, and receiving second media that is sent by the communication device by using the IP address and the port number of the apparatus that are used to receive media, where both the first media and the second media are encoded by adopting the media format included in the second media attribute parameter.

Further, in the application program stored by the memory 1630, an instruction that can be used to enable the processor 1620 to execute a process of obtaining a first media attribute parameter supported by the apparatus is specifically an instruction of executing the following processes:

invoking a new peer connection interface function in a browser application programming interface API of the apparatus; and generating a peer connection interface by using the new peer connection interface function, and obtaining, by using a create offer function included in the peer connection interface, the first media attribute parameter supported by the apparatus.

Therefore, by applying the apparatus for transmitting a media stream provided in the embodiment of the present invention, the apparatus receives, through a real-time collaboration channel established to a network computer, a real-time collaboration message that is sent by the network computer, initiates, through the network computer, media negotiation with a communication device according to the real-time collaboration message, and transmits a media stream mutually with the communication device according to a media attribute parameter determined through the media negotiation. Because of the technical characteristics that the apparatus exchanges the media attribute parameter with the communication device through the network computer, to complete the media negotiation between the apparatus and the communication device, and the apparatus transmits the media stream to the communication device, so that the apparatus and the communication device can directly transmit the media stream to each other, and no longer perform transmission by using the NC, thereby avoiding the problems in the prior art that the delay of the media stream is obvious and communication quality is reduced because the NC needs to perform conversion and transmission on media data, and bandwidth occupancy between a TC/PC and the NC is increased and bandwidth is wasted because a media stream needs to be transferred back and forth between the TC/PC and the NC through a VDI channel Therefore, the delay of the media stream is reduced, and the bandwidth is saved.

Embodiment 10

Figure 17:
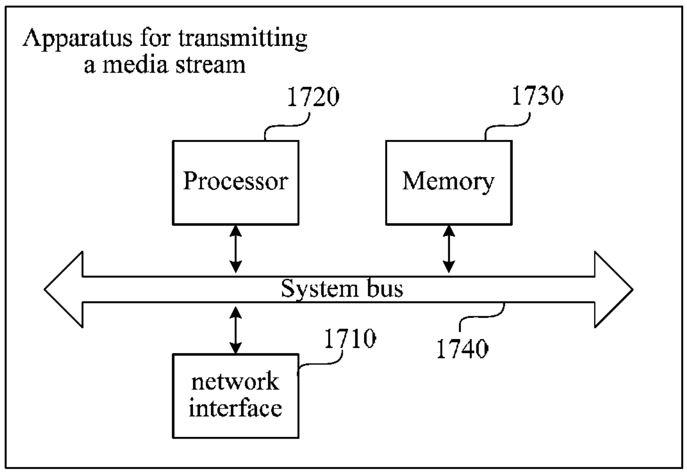
FIG. 17 is a hardware structural diagram of an apparatus for transmitting a media stream according to Embodiment 10 of the present invention.

In addition, the apparatus for transmitting a media stream provided in Embodiment 6 of the present invention may further adopt the following implementation manner, so as to implement the method for transmitting a media stream in the foregoing embodiment of the present invention. As shown in FIG. 17, a first virtualized desktop infrastructure VDI channel is established between the apparatus and the access terminal, and the apparatus for transmitting a media stream includes: a network interface 1710, a processor 1720 and a memory 1730. A system bus 1740 is configured to connect the network interface 1710, the processor 1720 and the memory 1730. The apparatus is allocated by a cloud server to an access terminal.

The network interface 1710 is configured to perform interaction communication with the access terminal, a WebRTC server and a communication device.

The memory 1730 may be a permanent memory, for example, a hard disk drive and a flash memory, and the memory 1730 is configured to store an application program, where the application program includes an instruction that can be used to enable the processor 1720 to access and execute the following:

establishing a real-time collaboration channel between the apparatus and the access terminal;

receiving an operation instruction that is input by a user and is sent by the access terminal through the first VDI channel;

when it is determined that the operation instruction is an operation instruction used to instruct that a call be initiated, sending a real-time collaboration message to the access terminal through the real-time collaboration channel, where the real-time collaboration message is used to instruct the access terminal to initiate media negotiation with the communication device; and forwarding information used to perform media negotiation between the access terminal and the communication device, to enable the access terminal and the communication device to determine, through the media negotiation, a media attribute parameter that is used to transmit a media stream between the access terminal and the communication device, so that the access terminal transmits a media stream mutually with the communication device according to the media attribute parameter determined through the media negotiation, where the information used to perform the media negotiation is transmitted between the apparatus and the access terminal through the real-time collaboration channel Further, in the application program stored by the memory 1730, an instruction that can be used to enable the processor 1720 to execute a process of establishing a real-time collaboration channel between the apparatus and the access terminal is specifically an instruction of executing the following processes:

establishing a WebSocket channel between the apparatus and the access terminal through a web socket WebSocket server; or, establishing a second VDI channel between the apparatus and the access terminal; or, establishing a point-to-point data channel between a browser in the apparatus and a browser in the access terminal by using a data channel mechanism in a browser web real-time communication WebRTC application of the apparatus.

Further, in the application program stored by the memory 1730, an instruction that can be used to enable the processor 1720 to execute a process of forwarding information used to perform media negotiation between the access terminal and the communication device, to enable the access terminal and the communication device to determine, through the media negotiation, a media attribute parameter that is used to transmit a media stream between the access terminal and the communication device is specifically an instruction of executing the following processes:

receiving a first media attribute parameter that is supported by the access terminal and is sent by the access terminal through the real-time collaboration channel, where the first media attribute parameter includes a media format supported by the access terminal, and an IP address and a port number that are used to receive media;

sending a connection request message to the communication device according to the operation instruction that is input by the user and used to instruct that a call be initiated, where the connection request message includes the first media attribute parameter;

receiving a connect reply message that is sent by the communication device when the communication device determines that the communication device supports the first media attribute parameter, where the connect reply message includes a second media attribute parameter supported by the communication device, and the second media attribute parameter includes an IP address and a port number of the communication device that are used to receive media, and a media format that is supported by both the access terminal and the communication device and is determined by the communication device according to the first media attribute parameter; and sending the second media attribute parameter to the access terminal through the real-time collaboration channel, so that the access terminal sends first media to the communication device by using the IP address and the port number of the communication device that are used to receive media, and receives second media that is sent by the communication device by using the IP address and the port number of the access terminal that are used to receive media, where both the first media and the second media are encoded by adopting the media format included in the second media attribute parameter.

Further, the application program stored by the memory 1730 further includes an instruction that can be used to enable the processor 1720 to execute the following processes:

invoking a WebRTC signaling message protocol stack; and performing encapsulation processing on the first media attribute parameter by using the signaling message protocol stack, to generate the connection request message, where the connection request message includes the first media attribute parameter.

Therefore, by applying the apparatus for transmitting a media stream provided in the embodiment of the present invention, an access terminal receives, through a real-time collaboration channel established to the apparatus, a real-time collaboration message that is sent by the apparatus, initiates, by using the apparatus, media negotiation with a communication device according to the real-time collaboration message, and transmits a media stream mutually with the communication device according to a media attribute parameter determined through the media negotiation. Because of the technical characteristics that the access terminal exchanges the media attribute parameter with the communication device through the apparatus, to complete the media negotiation between the access terminal and the communication device, and the access terminal transmits the media stream to the communication device, the access terminal and the communication device can directly transmit the media stream to each other, and no longer perform transmission by using the NC, thereby avoiding the problems in the prior art that the delay of the media stream is obvious and communication quality is reduced because the NC needs to perform conversion and transmission on media data, and bandwidth occupancy between a TC/PC and the NC is increased and bandwidth is wasted because a media stream needs to be transferred back and forth between the TC/PC and the NC through a VDI channel Therefore, the delay of the media stream is reduced, and the bandwidth is saved.

Embodiment 11

Figure 18:
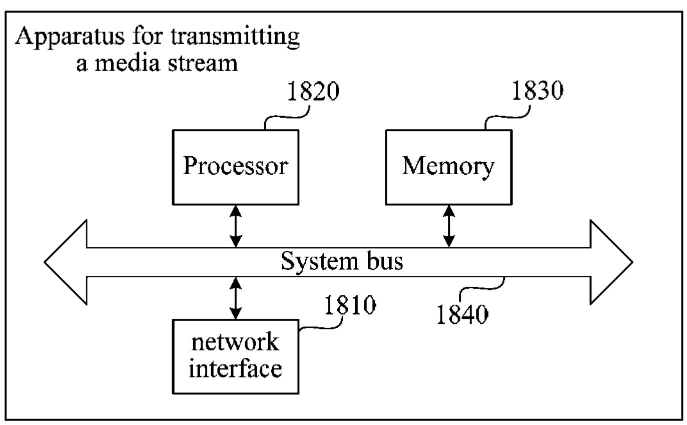
FIG. 18 is a hardware structural diagram of an apparatus for transmitting a media stream according to Embodiment 11 of the present invention.

In addition, the apparatus for transmitting a media stream provided in Embodiment 7 of the present invention may further adopt the following implementation manner, so as to implement the method for transmitting a media stream in the foregoing embodiment of the present invention. As shown in FIG. 18, a first virtualized desktop infrastructure VDI channel is established between the apparatus and a network computer allocated by a cloud server to the apparatus, and the apparatus for transmitting a media stream includes: a network interface 1810, a processor 1820 and a memory 1830. A system bus 1840 is configured to connect the network interface 1810, the processor 1820 and the memory 1830.

The network interface 1810 is configured to perform interaction communication with the network computer.

The memory 1830 may be a permanent memory, for example, a hard disk drive and a flash memory, and the memory 1830 is configured to store an application program, where the application program includes an instruction that can be used to enable the processor 1820 to access and execute the following:

establishing a real-time collaboration channel between the apparatus and the network computer;

receiving a real-time collaboration message that is sent by the network computer through the real-time collaboration channel, where the real-time collaboration message is sent by the network computer when the network computer receives a call request that is sent by a communication device and used to call a user corresponding to the apparatus, and the real-time collaboration message includes a first media attribute parameter that is supported by the communication device and is obtained by the network computer by parsing the call request, and is used to instruct the apparatus to perform media negotiation with the communication device according to the first media attribute parameter supported by the communication device;

performing media negotiation with the communication device through the network computer, so as to determine a media attribute parameter that is used to transmit a media stream between the apparatus and the communication device, where information used for the media negotiation is transmitted between the apparatus and the network computer through the real-time collaboration channel; and transmitting a media stream mutually with the communication device according to the media attribute parameter determined through the media negotiation.

Further, in the application program stored by the memory 1830, an instruction that can be used to enable the processor 1820 to execute a process of establishing a real-time collaboration channel between the apparatus and the network computer is specifically an instruction of executing the following process:

establishing a WebSocket channel between the apparatus and the network computer through a web socket WebSocket server; or, establishing a second VDI channel between the apparatus and the network computer; or, establishing a point-to-point data channel between a browser in the apparatus and a browser in the network computer by using a data channel mechanism in a browser web real-time communication WebRTC application of the apparatus.

Further, the first media attribute parameter includes a media format supported by the communication device, and an IP address and a port number that are used to receive media.

Further, in the application program stored by the memory 1830, an instruction that can be used to enable the processor 1820 to execute a process of performing media negotiation with the communication device through the network computer, so as to determine a media attribute parameter that is used to transmit a media stream between the apparatus and the communication device is specifically an instruction of executing the following processes:

determining a second media attribute parameter supported by the apparatus according to the first media attribute parameter, where the second media attribute parameter includes an IP address and a port number of the apparatus that are used to receive media, and a media format that is supported by both the apparatus and the communication device and is determined by the apparatus according to the first media attribute parameter; and sending the second media attribute parameter to the network computer through the real-time collaboration channel, so as to enable the network computer to forward the second media attribute parameter to the communication device.

Further, in the application program stored by the memory 1830, an instruction that can be used to enable the processor 1820 to execute a process of transmitting a media stream mutually with the communication device according to the media attribute parameter determined through the media negotiation is specifically an instruction of executing the following process:

sending first media to the communication device by using the IP address and the port number of the communication device that are used to receive media, and receiving second media that is sent by the communication device by using the IP address and the port number of the apparatus that are used to receive media, where both the first media and the second media are encoded by adopting the media format included in the second media attribute parameter.

Further, in the application program stored by the memory 1830, an instruction that can be used to enable the processor 1820 to execute a process of determining the second media attribute parameter according to the first media attribute parameter is specifically an instruction of executing the following processes:

invoking a new peer connection interface function in a browser application programming interface API of the apparatus; and generating a peer connection interface by using the new peer connection interface function, and obtaining the second media attribute parameter by using a create answer function included in the peer connection interface.

Therefore, by applying the apparatus for transmitting a media stream provided in the embodiment of the present invention, the apparatus receives, through a real-time collaboration channel established to a network computer, a real-time collaboration message that is sent by the network computer, initiates, through the network computer, media negotiation with a communication device according to the real-time collaboration message, and transmits a media stream mutually with the communication device according to a media attribute parameter determined through the media negotiation. Because of the technical characteristics that the apparatus exchanges the media attribute parameter with the communication device through the network computer, to complete the media negotiation between the apparatus and the communication device, and the apparatus transmits the media stream to the communication device, so that the apparatus and the communication device can directly transmit the media stream to each other, and no longer perform transmission by using the NC, thereby avoiding the problems in the prior art that the delay of the media stream is obvious and communication quality is reduced because the NC needs to perform conversion and transmission on media data, and bandwidth occupancy between a TC/PC and the NC is increased and bandwidth is wasted because a media stream needs to be transferred back and forth between the TC/PC and the NC through a VDI channel Therefore, the delay of the media stream is reduced, and the bandwidth is saved.

Embodiment 12

Figure 19:
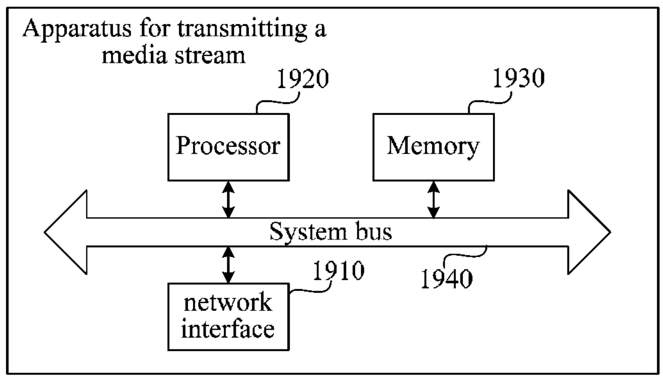
FIG. 19 is a hardware structural diagram of an apparatus for transmitting a media stream according to Embodiment 12 of the present invention.

In addition, the apparatus for transmitting a media stream provided in Embodiment 8 of the present invention may further adopt the following implementation manner, so as to implement the method for transmitting a media stream in the foregoing embodiment of the present invention. As shown in FIG. 19, a first virtualized desktop infrastructure VDI channel is established between the apparatus and the access terminal, and the apparatus for transmitting a media stream includes: a network interface 1910, a processor 1920 and a memory 1930. A system bus 1940 is configured to connect the network interface 1910, the processor 1920 and the memory 1930. The apparatus is allocated by a cloud server to the access terminal.

The network interface 1910 is configured to perform interaction communication with the access terminal, a WebRTC server and a communication device.

The memory 1930 may be a permanent memory, for example, a hard disk drive and a flash memory, and the memory 1930 is configured to store an application program, where the application program includes an instruction that can be used to enable the processor 1920 to access and execute the following:

establishing a real-time collaboration channel between the apparatus and the access terminal;

receiving a call request that is sent by the communication device and used to call a user corresponding to the access terminal;

sending, according to the call request, a real-time collaboration message to the access terminal through the real-time collaboration channel, where the real-time collaboration message includes a first media attribute parameter that is supported by the communication device and is obtained by the apparatus by parsing the call request, and is used to instruct the access terminal to perform media negotiation with the communication device according to the first media attribute parameter supported by the communication device; and forwarding information used to perform media negotiation between the access terminal and the communication device, to enable the access terminal and the communication device to determine, through the media negotiation, a media attribute parameter that is used to transmit a media stream between the access terminal and the communication device, so that the access terminal transmits a media stream mutually with the communication device according to the media attribute parameter determined through the media negotiation, where the information used to perform the media negotiation is transmitted between the apparatus and the access terminal through the real-time collaboration channel Further, in the application program stored by the memory 1930, an instruction that can be used to enable the processor 1920 to execute a process of establishing a real-time collaboration channel between the apparatus and the access terminal is specifically an instruction of executing the following process:

establishing a WebSocket channel between the apparatus and the access terminal through a web socket WebSocket server; or, establishing a second VDI channel between the apparatus and the access terminal; or, establishing a point-to-point data channel between a browser in the apparatus and a browser in the access terminal by using a data channel mechanism in a browser web real-time communication WebRTC application of the apparatus.

Further, the first media attribute parameter includes a media format supported by the communication device, and an IP address and a port number that are used to receive media.

Further, in the application program stored by the memory 1930, an instruction that can be used to enable the processor 1920 to execute a process of forwarding information used to perform media negotiation between the access terminal and the communication device, to enable the access terminal and the communication device to determine, through the media negotiation, a media attribute parameter that is used to transmit a media stream between the access terminal and the communication device is specifically an instruction of executing the following processes:

receiving a second media attribute parameter that is sent by the access terminal through the real-time collaboration channel, where the second media attribute parameter includes an IP address and a port number of the access terminal that are used to receive media, and a media format that is supported by both the access terminal and the communication device and is determined by the access terminal according to the first media attribute parameter; and forwarding the second media attribute parameter to the communication device, so that the communication device sends first media to the access terminal by using the IP address and the port number of the access terminal that are used to receive media, and receives second media that is sent by the access terminal by using the IP address and the port number of the communication device that are used to receive media, where both the first media and the second media are encoded by adopting the media format included in the second media attribute parameter.

Further, the application program stored by the memory 1930 further includes an instruction that can be used to enable the processor 1920 to execute the following processes:

invoking a WebRTC signaling message protocol stack;

performing encapsulation processing on the second media attribute parameter by using the signaling message protocol stack, to generate a call response; and sending the call response to the communication device, where the call response includes the second media attribute parameter.

Therefore, by applying the apparatus for transmitting a media stream provided in the embodiment of the present invention, an access terminal receives, through a real-time collaboration channel established to the apparatus, a real-time collaboration message that is sent by the apparatus, initiates, by using the apparatus, media negotiation with a communication device according to the real-time collaboration message, and transmits a media stream mutually with the communication device according to a media attribute parameter determined through the media negotiation. Because of the technical characteristics that the access terminal exchanges the media attribute parameter with the communication device through the apparatus, to complete the media negotiation between the access terminal and the communication device, and the access terminal transmits the media stream to the communication device, the access terminal and the communication device can directly transmit the media stream to each other, and no longer perform transmission by using the NC, thereby avoiding the problems in the prior art that the delay of the media stream is obvious and communication quality is reduced because the NC needs to perform conversion and transmission on media data, and bandwidth occupancy between a TC/PC and the NC is increased and bandwidth is wasted because a media stream needs to be transferred back and forth between the TC/PC and the NC through a VDI channel Therefore, the delay of the media stream is reduced, and the bandwidth is saved.

79

Embodiment 13

Figure 20:
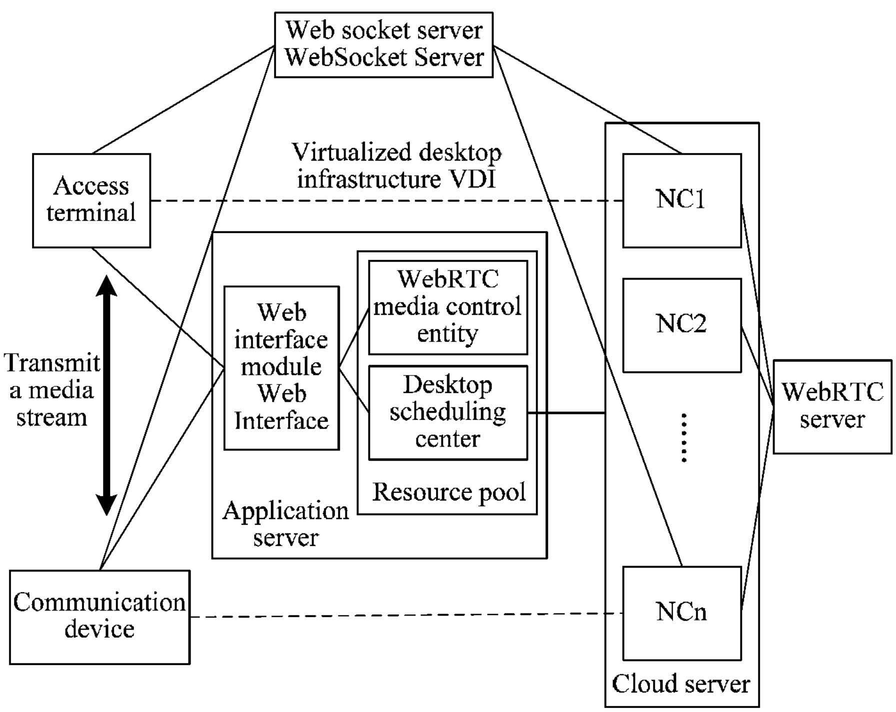
FIG. 20 is a schematic diagram of a system for transmitting a media stream according to Embodiment 13 of the present invention.

Correspondingly, Embodiment 13 of the present invention further provides a system for transmitting a media stream. As shown in FIG. 20, the system includes the apparatuses for transmitting a media stream provided in Embodiment 5 of the present invention and Embodiment 6 of the present invention;

or, the system includes the apparatuses for transmitting a media stream provided in Embodiment 9 of the present invention and Embodiment 10 of the present invention.

Further, the system further includes: a WebRTC server.

Further, the system further includes: an application server, where the application server includes a web interface module, and a resource pool; and the resource pool includes a desktop scheduling center and a WebRTC media control entity.

As shown in FIG. 20, by using both of an access terminal and a communication device being a desktop cloud terminal as an example, both of the access terminal and the communication device access a cloud server through a desktop scheduling center in a network interface resource pool. According to allocation of the cloud server, a WebSocket server is connected to corresponding network computer 1 to network computer N, to transfer a real-time collaboration message, and network computer 1 to network computer N transfer the message through the WebRTC server.

Therefore, by applying the system for transmitting a media stream provided in the embodiment of the present invention, an access terminal receives, through a real-time collaboration channel established to a network computer, a real-time collaboration message that is sent by the network computer, initiates, through the network computer, media negotiation with a communication device according to the real-time collaboration message, and transmits a media stream mutually with the communication device according to a media attribute parameter determined through the media negotiation. Because of the technical characteristics that the access terminal exchanges the media attribute parameter with the communication device through the network computer, to complete the media negotiation between the access terminal and the communication device, and the access terminal transmits the media stream to the communication device, the access terminal and the communication device can directly transmit the media stream to each other, and no longer perform transmission by using the NC, thereby avoiding the problems in the prior art that the delay of the media stream is obvious and communication quality is reduced because the NC needs to perform conversion and transmission on media data, and bandwidth occupancy between a TC/PC and the NC is increased and bandwidth is wasted because a media stream needs to be transferred back and forth between the TC/PC and the NC through a VDI channel Therefore, the delay of the media stream is reduced, and the bandwidth is saved.

Embodiment 14

Figure 21:
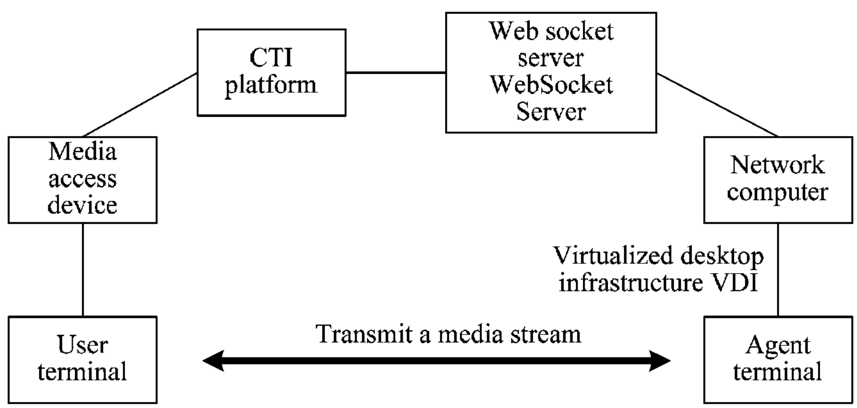
FIG. 21 is a schematic diagram of another system for transmitting a media stream according to Embodiment 14 of the present invention.

Correspondingly, Embodiment 14, of the present invention further provides a system for transmitting a media stream. As shown in FIG. 21, the system includes the apparatuses for transmitting a media stream provided in Embodiment 7 of the present invention and Embodiment 8 of the present invention;

or, the system includes the apparatuses for transmitting a media stream provided in Embodiment 11 of the present invention and Embodiment 12 of the present invention.

Further, the system further includes: a CTI platform.

Further, the system further includes: a WebRTC server.

In the embodiment of the present invention, an access terminal is specifically an agent terminal, and a communication device is specifically a media access device.

Therefore, by applying the system for transmitting a media stream provided in the embodiment of the present invention, an access terminal receives, through a real-time collaboration channel established to a network computer, a real-time collaboration message that is sent by the network computer, initiates, through the network computer, media negotiation with a communication device according to the real-time collaboration message, and transmits a media stream mutually with the communication device according to a media attribute parameter determined through the media negotiation. Because of the technical characteristics that the access terminal exchanges the media attribute parameter with the communication device through the network computer, to complete the media negotiation between the access terminal and the communication device, and the access terminal transmits the media stream to the communication device, the access terminal and the communication device can directly transmit the media stream to each other, and no longer perform transmission by using the NC, thereby avoiding the problems in the prior art that the delay of the media stream is obvious and communication quality is reduced because the NC needs to perform conversion and transmission on media data, and bandwidth occupancy between a TC/PC and the NC is increased and bandwidth is wasted because a media stream needs to be transferred back and forth between the TC/PC and the NC through a VDI channel Therefore, the delay of the media stream is reduced, and the bandwidth is saved.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In combination with the embodiments disclosed in this specification, method or algorithm steps may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The foregoing specific embodiments clarify the objective, technical solutions, and benefits of the present invention in detail. It should be understood that the foregoing descriptions are merely specific embodiments of the present invention, but are not intended to limit the protection scope of the present invention. Any modification, equivalent replacement, or improvement made without departing from the spirit and principle of the present invention should fall within the protection scope of the present invention.

What is claimed is:

1. A method for transmitting a media stream, wherein the method is executed by an access terminal; a first virtualized desktop infrastructure (VDI) channel is established between the access terminal and a network computer allocated by a cloud server to the access terminal; and the method comprises:

establishing, by the access terminal, a real-time collaboration channel between the access terminal and the network computer, the real-time collaboration channel being separate from the first VDI channel;

sending, by the access terminal through the first VDI channel to the network computer, an operation instruction obtained by a user application interface;

receiving, by the access terminal, a real-time collaboration message from the network computer through the real-time collaboration channel, the real-time collaboration message instructing the access terminal to initiate media negotiation with a communication device when the operation instruction indicates that a call to the communication device be initiated;

performing, by the access terminal through the network computer, the media negotiation with the communication device to determine a media attribute parameter, wherein information used for the media negotiation is transmitted between the access terminal and the network computer through the real-time collaboration channel; and transmitting, by the access terminal, the media stream to the communication device according to the media attribute parameter.

2. The method for transmitting a media stream according to claim 1, wherein the performing, by the access terminal through the network computer, the media negotiation with the communication device comprises:

obtaining, by the access terminal, a first media attribute parameter supported by the access terminal, wherein the first media attribute parameter comprises a media format supported by the access terminal, and an IP address and a port number of the access terminal that are used to receive media;

sending, by the access terminal, the first media attribute parameter to the network computer through the real-time collaboration channel, so as to enable the network computer to send a connection request message carrying the first media attribute parameter to the communication device to be called; and receiving, by the access terminal, a second media attribute parameter that is received by the network computer from the communication device and is sent by the network computer through the real-time collaboration channel, wherein the second media attribute parameter comprises an IP address and a port number of the communication device that are used to receive the media, and a media format that is supported by both the access terminal and the communication device and is determined by the communication device according to the first media attribute parameter; and the transmitting, by the access terminal, the media stream mutually with the communication device according to the media attribute parameter determined through the media negotiation comprises:

sending, by the access terminal, first media to the communication device by using the IP address and the port number of the communication device that are used to receive the media, and receiving second media that is sent by the communication device by using the IP address and the port number of the access terminal that are used to receive the media, wherein both the first media and the second media are encoded by adopting the media format comprised in the second media attribute parameter.

3. The method for transmitting a media stream according to claim 2, wherein the obtaining, by the access terminal, the first media attribute parameter supported by the access terminal comprises:

invoking, by the access terminal, a new peer connection interface function in a browser application programming interface (API) of the access terminal; and generating, by the access terminal, a peer connection interface by using the new peer connection interface function, and obtaining, by using a create offer function comprised in the peer connection interface, the first media attribute parameter supported by the access terminal.

4. The method for transmitting a media stream according to claim 1, wherein the establishing, by the access terminal, the real-time collaboration channel between the access terminal and the network computer comprises one of:

establishing, by the access terminal, a WebSocket channel between the access terminal and the network computer through a web socket WebSocket server;

establishing, by the access terminal, a second VDI channel between the access terminal and the network computer; and establishing, by the access terminal, a point-to-point data channel between a browser in the access terminal and a browser in the network computer by using a data channel mechanism in a browser web real-time communication (WebRTC) application of the access terminal.

5. A method for transmitting a media stream, wherein the method is executed by a network computer allocated by a cloud server to an access terminal; a first virtualized desktop infrastructure (VDI) channel is established between the network computer and the access terminal; and the method comprises:

establishing, by the network computer, a real-time collaboration channel between the network computer and the access terminal, the real-time collaboration channel being separate from the first VDI channel;

receiving, by the network computer, an operation instruction from the access terminal through the first VDI channel;

when the network computer determines that the operation instruction indicates that a call to a communication device be initiated, sending, by the network computer, a real-time collaboration message to the access terminal through the real-time collaboration channel, the real-time collaboration message instructing the access terminal to initiate media negotiation with the communication device to be called; and forwarding, by the network computer to the access terminal through the real-time collaboration channel, information for performing the media negotiation between the access terminal and the communication device, for determining, through the media negotiation, a media attribute parameter for transmitting a media stream between the access terminal and the communication device.

6. The method for transmitting a media stream according to claim 5, wherein the forwarding, by the network computer, the information used to perform the media negotiation between the access terminal and the communication device comprises:

receiving, by the network computer, a first media attribute parameter that is supported by the access terminal and is sent by the access terminal through the real-time collaboration channel, wherein the first media attribute parameter comprises a media format supported by the access terminal, and an IP address and a port number of the access terminal that are used to receive media;

sending, by the network computer, a connection request message to the communication device according to the operation instruction, wherein the connection request message comprises the first media attribute parameter;

receiving, by the network computer, a connect reply message that is sent by the communication device when the communication device determines that the communication device supports the first media attribute parameter, wherein the connect reply message comprises a second media attribute parameter supported by the communication device, and the second media attribute parameter comprises an IP address and a port number of the communication device that are used to receive media, and a media format that is supported by both the access terminal and the communication device and is determined by the communication device according to the first media attribute parameter; and sending, by the network computer, the second media attribute parameter to the access terminal through the real-time collaboration channel, so that the access terminal sends first media to the communication device by using the IP address and the port number of the communication device that are used to receive the media, and receives second media that is sent by the communication device by using the IP address and the port number of the access terminal that are used to receive the media, wherein both the first media and the second media are encoded by adopting the media format comprised in the second media attribute parameter.

7. The method for transmitting a media stream according to claim 6, before the sending, by the network computer, the connection request message to the communication device according to the operation instruction, further comprising:

invoking, by the network computer, a WebRTC signaling message protocol stack; and performing, by the network computer, encapsulation processing on the first media attribute parameter by using the signaling message protocol stack, to generate the connection request message, wherein the connection request message comprises the first media attribute parameter.

8. The method for transmitting a media stream according to claim 5, wherein the establishing, by the network computer, the real-time collaboration channel between the network computer and the access terminal comprises one of:

establishing, by the network computer, a WebSocket channel between the network computer and the access terminal through a web socket WebSocket server;

establishing, by the network computer, a second VDI channel between the network computer and the access terminal; and establishing, by the network computer, a point-to-point data channel between a browser in the network computer and a browser in the access terminal by using a data channel mechanism in a browser web real-time communication (WebRTC) application of the network computer.

9. A method for transmitting a media stream, wherein the transmission method is executed by an access terminal; a first virtualized desktop infrastructure (VDI) channel is established between the access terminal and a network computer allocated by a cloud server to the access terminal; and the method comprises:

establishing, by the access terminal, a real-time collaboration channel between the access terminal and the network computer, the real-time collaboration channel being separate from the first VDI channel;

receiving, by the access terminal, a real-time collaboration message from the network computer through the real-time collaboration channel, wherein the real-time collaboration message comprises a first media attribute parameter that is supported by a communication device and that is obtained by parsing a call request of the communication device, and wherein the real-time collaboration message instructs the access terminal to perform media negotiation with the communication device according to the first media attribute parameter supported by the communication device;

performing, by the access terminal through the network computer, the media negotiation with the communication device to determine a media attribute parameter, wherein information used for the media negotiation is transmitted between the access terminal and the network computer through the real-time collaboration channel; and transmitting, by the access terminal, the media stream to the communication device according to the media attribute parameter.

10. The method for transmitting a media stream according to claim 9, wherein the first media attribute parameter comprises a media format supported by the communication device, and an IP address and a port number of the communication device that are used to receive media;

the performing, by the access terminal through the network computer, the media negotiation with the communication device comprises:

determining, by the access terminal according to the first media attribute parameter, a second media attribute parameter supported by the access terminal, wherein the second media attribute parameter comprises an IP address and a port number of the access terminal that are used to receive media, and a media format that is supported by both the access terminal and the communication device and is determined by the access terminal according to the first media attribute parameter; and sending, by the access terminal, the second media attribute parameter to the network computer through the real-time collaboration channel, so as to enable the network computer to forward the second media attribute parameter to the communication device; and the transmitting, by the access terminal, the media stream to the communication device according to the media attribute parameter comprises:

sending, by the access terminal, first media to the communication device by using the IP address and the port number of the communication device that are used to receive the media, and receiving second media that is sent by the communication device by using the IP address and the port number of the access terminal that are used to receive the media, wherein both the first media and the second media are encoded by adopting the media format comprised in the second media attribute parameter.

11. The method for transmitting a media stream according to claim 10, wherein the determining, by the access terminal, the second media attribute parameter according to the first media attribute parameter comprises:

invoking, by the access terminal, a new peer connection interface function in a browser application programming interface (API) of the access terminal; and generating, by the access terminal, a peer connection interface by using the new peer connection interface function, and obtaining the second media attribute parameter by using a create answer function comprised in the peer connection interface.

12. The method for transmitting a media stream according to claim 9, wherein the establishing, by the access terminal, the real-time collaboration channel between the access terminal and the network computer comprises one of:

establishing, by the access terminal, a WebSocket channel between the access terminal and the network computer through a web socket WebSocket server;

establishing, by the access terminal, a second VDI channel between the access terminal and the network computer; and establishing, by the access terminal, a point-to-point data channel between a browser in the access terminal and a browser in the network computer by using a data channel mechanism in a browser web real-time communication WebRTC application of the access terminal.

13. A method for transmitting a media stream, wherein the method is executed by a network computer allocated by a cloud server to an access terminal; a first virtualized desktop infrastructure (VDI) channel is established between the network computer and the access terminal; and the method comprises:

establishing, by the network computer, a real-time collaboration channel between the network computer and the access terminal, the real-time collaboration channel being separate from the first VDI channel;

receiving, by the network computer from a communication device, a call request for calling a user corresponding to the access terminal;

obtaining, by the network computer, by parsing the call request, a first media attribute parameter that is supported by the communication device;

sending, by the network computer according to the call request, a real-time collaboration message to the access terminal through the real-time collaboration channel, wherein the real-time collaboration message comprises the first media attribute parameter and instructs the access terminal to perform media negotiation with the communication device according to the first media attribute parameter; and forwarding, by the network computer to the access terminal through the real-time collaboration channel, information for performing the media negotiation between the access terminal and the communication device, for determining, through the media negotiation, a media attribute parameter for transmitting a media stream between the access terminal and the communication device.

14. The method for transmitting a media stream according to claim 13, wherein the first media attribute parameter comprises a media format supported by the communication device, and an IP address and a port number of the communication device that are used to receive media; and the forwarding, by the network computer, the information for performing the media negotiation between the access terminal and the communication device, comprises:

receiving, by the network computer, a second media attribute parameter that is sent by the access terminal through the real-time collaboration channel, wherein the second media attribute parameter comprises an IP address and a port number of the access terminal that are used to receive the media, and a media format that is supported by both the access terminal and the communication device and is determined by the access terminal according to the first media attribute parameter; and forwarding, by the network computer, the second media attribute parameter to the communication device.

15. The method for transmitting a media stream according to claim 14, before the forwarding, by the network computer, the second media attribute parameter to the communication device, further comprising:

invoking, by the network computer, a web real-time communication (WebRTC) signaling message protocol stack;

performing, by the network computer, encapsulation processing on the second media attribute parameter by using the WebRTC signaling message protocol stack, to generate a call response; and sending, by the network computer, the call response to the communication device, wherein the call response comprises the second media attribute parameter.

16. The method for transmitting a media stream according to claim 13, wherein the establishing, by the network computer, the real-time collaboration channel between the network computer and the access terminal comprises one of:

establishing, by the network computer, a WebSocket channel between the network computer and the access terminal through a web socket WebSocket server;

establishing, by the network computer, a second VDI channel between the network computer and the access terminal; and establishing, by the network computer, a point-to-point data channel between a browser in the network computer and a browser in the access terminal by using a data channel mechanism in a browser web real-time communication (WebRTC) application of the network computer.

17. An apparatus for transmitting a media stream, wherein a first virtualized desktop infrastructure (VDI) channel is established between the apparatus and a network computer allocated by a cloud server to the apparatus; and the apparatus comprises:

a processor; and a non-transitory computer readable medium which contains computer-executable instructions for transmitting the media stream, the processor is configured to execute the computer-executable instructions to perform operations comprising:

establishing a real-time collaboration channel between the apparatus and the network computer, the real-time collaboration channel being separate from the first VDI channel;

sending through the first VDI channel to the network computer, an operation instruction obtained by a user application interface;

receiving a real-time collaboration message from the network computer through the real-time collaboration channel, the real-time collaboration message instructing the apparatus to initiate media negotiation with a communication device when the operation instruction indicates that a call to the communication device be initiated;

performing the media negotiation with the communication device to determine a media attribute parameter, wherein information used for the media negotiation is transmitted between the apparatus and the network computer through the real-time collaboration channel; and transmitting the media stream to the communication device according to the media attribute parameter.

18. The apparatus according to claim 17, wherein the operation of establishing the real-time collaboration channel between the apparatus and the network computer comprises one of:

establishing a WebSocket channel between the apparatus and the network computer through a web socket WebSocket server;

establishing a second VDI channel between the apparatus and the network computer; and establishing a point-to-point data channel between a browser in the apparatus and a browser in the network computer by using a data channel mechanism in a browser web real-time communication (WebRTC) application of the apparatus.

19. An apparatus for transmitting a media stream, wherein the apparatus is allocated by a cloud server to an access terminal; a first virtualized desktop infrastructure (VDI) channel is established between the apparatus and the access terminal; and the apparatus comprises:

a processor; and a non-transitory computer readable medium which contains computer-executable instructions for transmitting the media stream, the processor is configured to execute the computer-executable instructions to perform operations comprising:

establishing a real-time collaboration channel between the apparatus and the access terminal, the real-time collaboration channel being separate from the first VDI channel;

receiving an operation instruction from the access terminal through the first VDI channel;

when determining that the operation instruction indicates that a call to a communication device be initiated, sending a real-time collaboration message to the access terminal through the real-time collaboration channel, the real-time collaboration message instructing the access terminal to initiate media negotiation with the communication device to be called; and forwarding, to the access terminal through the real-time collaboration channel, information for performing the media negotiation between the access terminal and the communication device, for determining, through the media negotiation, a media attribute parameter for transmitting a media stream between the access terminal and the communication device.

20. The apparatus according to claim 19, wherein the operation of establishing the real-time collaboration channel between the apparatus and the access terminal comprises one of:

establishing a WebSocket channel between the apparatus and the access terminal through a web socket WebSocket server;

establishing a second VDI channel between the apparatus and the access terminal; and establishing a point-to-point data channel between a browser in the apparatus and a browser in the access terminal by using a data channel mechanism in a browser web real-time communication WebRTC application of the apparatus.

21. An apparatus for transmitting a media stream, wherein a first virtualized desktop infrastructure (VDI) channel is established between the apparatus and a network computer allocated by a cloud server to the apparatus; and the apparatus comprises:

a processor; and a non-transitory computer readable medium which contains computer-executable instructions for transmitting the media stream, the processor is configured to execute the computer-executable instructions to perform operations comprising:

establishing a real-time collaboration channel between the apparatus and the network computer, the real-time collaboration channel being separate from the first VDI channel;

receiving a real-time collaboration message from the network computer through the real-time collaboration channel, wherein the real-time collaboration message comprises a first media attribute parameter that is supported by a communication device and that is obtained by parsing a call request of the communication device, and wherein the real-time collaboration message instructs the apparatus to perform media negotiation with the communication device according to the first media attribute parameter supported by the communication device;

performing through the network computer, the media negotiation with the communication device to determine a media attribute parameter, wherein information used for the media negotiation is transmitted between the apparatus and the network computer through the real-time collaboration channel; and transmitting the media stream to the communication device according to the media attribute parameter.

22. The apparatus according to claim 21, wherein the operation of establishing the real-time collaboration channel between the apparatus and the network computer comprises one of:

establishing a WebSocket channel between the apparatus and the network computer through a web socket WebSocket server;

establishing a second VDI channel between the apparatus and the network computer; and establishing a point-to-point data channel between a browser in the apparatus and a browser in the network computer by using a data channel mechanism in a browser web real-time communication (WebRTC) application of the apparatus.

23. An apparatus for transmitting a media stream, wherein the apparatus is allocated by a cloud server to an access terminal; a first virtualized desktop infrastructure (VDI) channel is established between the apparatus and the access terminal; and the apparatus comprises:

a processor; and a non-transitory computer readable medium which contains computer-executable instructions for transmitting the media stream, the processor is configured to execute the computer-executable instructions to perform operations comprising:

establishing a real-time collaboration channel between the apparatus and the access terminal, the real-time collaboration channel being separate from the first VDI channel;

receiving, from a communication device, a call request for calling a user corresponding to the access terminal;

obtaining, by parsing the call request, a first media attribute parameter that is supported by the communication device;

sending according to the call request, a real-time collaboration message to the access terminal through the real-time collaboration channel, wherein the real-time collaboration message comprises the first media attribute parameter and instructs the access terminal to perform media negotiation with the communication device according to the first media attribute parameter; and forwarding, to the access terminal through the real-time collaboration channel, information for performing the media negotiation between the access terminal and the communication device, for determining, through the media negotiation, a media attribute parameter for transmitting the media stream between the access terminal and the communication device.

24. The apparatus according to claim 23, wherein the operation of establishing the real-time collaboration channel between the apparatus and the access terminal comprises one of:

establishing a WebSocket channel between the apparatus and the access terminal through a web socket WebSocket server;

establishing a second VDI channel between the apparatus and the access terminal; and establishing a point-to-point data channel between a browser in the apparatus and a browser in the access terminal by using a data channel mechanism in a browser web real-time communication (WebRTC) application of the apparatus.

* * * * *